(12) United States Patent
Yuno et al.

(10) Patent No.: US 12,181,018 B2
(45) Date of Patent: Dec. 31, 2024

(54) SHOCK ABSORBER

(71) Applicant: Hitachi Astemo, Ltd., Ibaraki (JP)

(72) Inventors: Osamu Yuno, Hitachinaka (JP); Takao Nakadate, Hitachinaka (JP); Shunsuke Mori, Hitachinaka (JP); Yu Ishimaru, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 280 days.

(21) Appl. No.: 17/423,330

(22) PCT Filed: Jan. 10, 2020

(86) PCT No.: PCT/JP2020/000610
§ 371 (c)(1),
(2) Date: Jul. 15, 2021

(87) PCT Pub. No.: WO2020/149224
PCT Pub. Date: Jul. 23, 2020

(65) Prior Publication Data
US 2022/0099153 A1    Mar. 31, 2022

(30) Foreign Application Priority Data
Jan. 18, 2019  (JP) ................................ 2019-007104

(51) Int. Cl.
*F16F 9/348*  (2006.01)
*F16F 9/46*  (2006.01)

(52) U.S. Cl.
CPC .......... *F16F 9/3481* (2013.01); *F16F 9/3484* (2013.01); *F16F 9/46* (2013.01)

(58) Field of Classification Search
CPC ........ F16F 9/3485; F16F 9/348; F16F 9/3488; F16F 9/5126; F16F 9/3481; F16F 9/46
(Continued)

(56) References Cited

U.S. PATENT DOCUMENTS

| | | | |
|---|---|---|---|
| 6,540,052 B2 * | 4/2003 | Fenn ....................... | F16F 9/348 188/322.22 |
| 2005/0263363 A1 * | 12/2005 | Katou ................... | F16F 9/3485 188/322.22 |

(Continued)

FOREIGN PATENT DOCUMENTS

| JP | 03199732 A | * | 8/1991 |
|---|---|---|---|
| JP | 2004-257507 | | 9/2004 |

(Continued)

OTHER PUBLICATIONS

International Search Report issued Mar. 17, 2020 in International Application No. PCT/JP2020/000610, with English-language translation.

(Continued)

*Primary Examiner* — Vishal R Sahni
(74) *Attorney, Agent, or Firm* — Wenderoth, Lind & Ponack, L.L.P.

(57) ABSTRACT

Provided is a shock absorber in which a check valve seated on a seat portion (second seat portion) having an annular shape is quickly opened during a reverse stroke. As a result, a working fluid in a chamber on a downstream side can be quickly introduced into a back-pressure chamber. Hence, a delay in response of a damping force, which may be caused by sticking of the check valve to a relief valve, can be suppressed.

9 Claims, 11 Drawing Sheets

(58) Field of Classification Search
USPC .................................................. 188/282.5
See application file for complete search history.

(56) References Cited

U.S. PATENT DOCUMENTS

| | | | |
|---|---|---|---|
| 2005/0279597 A1 | 12/2005 | Yamaguchi | |
| 2011/0186393 A1 | 8/2011 | Maeda et al. | |
| 2016/0223047 A1* | 8/2016 | Kim ...................... | F16F 9/5165 |
| 2017/0080767 A1* | 3/2017 | Yamashita .............. | F16F 9/182 |
| 2017/0082169 A1* | 3/2017 | Kim ...................... | F16F 9/3488 |
| 2017/0114857 A1* | 4/2017 | Kim .......................... | F16F 9/44 |
| 2019/0048964 A1* | 2/2019 | Ericksen .................. | F16F 9/19 |
| 2020/0003272 A1 | 1/2020 | Yamashita | |
| 2020/0032872 A1 | 1/2020 | Kadokura et al. | |

FOREIGN PATENT DOCUMENTS

| | | | | |
|---|---|---|---|---|
| JP | 2005-344911 | 12/2005 | | |
| JP | 2011-158019 | 8/2011 | | |
| WO | WO-2018021136 A1 * | 2/2018 | ................ | F16F 9/32 |
| WO | 2018/135461 | 7/2018 | | |
| WO | 2018/163868 | 9/2018 | | |

OTHER PUBLICATIONS

Written Opinion of the International Searching Authority issued Mar. 17, 2020 in International Application No. PCT/JP2020/000610, with English-language translation.

* cited by examiner

SHOCK ABSORBER

TECHNICAL FIELD

The present invention relates to a shock absorber including a damping-force generating mechanism built in a cylinder.

BACKGROUND ART

In Patent Literature 1, there is disclosed a shock absorber configured to open a non-return valve provided to a relief valve to introduce a pressure in a downstream-side chamber into a back-pressure chamber so as to hold a main valve in a valve-closed state during a reverse stroke.

CITATION LIST

Patent Literature

PTL 1: JP 2005-344911 A

SUMMARY OF INVENTION

Technical Problem

In the shock absorber as described in Patent Literature 1, a hole (passage) formed in the relief valve is directly closed by the non-return valve having a disc-like shape. Thus, when the non-return valve sticks to the relief valve and it becomes difficult to open the non-return valve, the pressure in the downstream-side chamber cannot be quickly introduced into the back-pressure chamber during the reverse stroke. As a result, the main valve is forced to be opened by a pressure in an upstream-side chamber during the reverse stroke. Thus, there arises a problem in that a delay in response of a damping force occurs due to pressure leakage. Further, for the shock absorber as described in Patent Literature 1, a volume is not ensured when the main valve is opened. Specifically, a working fluid cannot be quickly discharged from the back-pressure chamber. Thus, overshoot of the damping force may occur.

Solution to Problem

An object of the present invention is to provide a shock absorber in which a delay in response of a damping force is suppressed.

According to one embodiment of the present invention, there is provided a shock absorber, including: a cylinder in which a working fluid is enclosed; a piston, which is slidably inserted into the cylinder, and is configured to partition an inside of the cylinder into two chambers; a piston rod, which is coupled to the piston, and extends to an outside of the cylinder; a passage in which flow of the working fluid is caused by movement of the piston in one direction; a main valve configured to apply a resistance force to flow of the working fluid in the passage from the chamber on an upstream side to the chamber on a downstream side; a back-pressure chamber configured to exert an internal pressure on the main valve in a valve-closing direction of the main valve; a case member having a bottomed cylindrical shape with an opening portion at one end, over which the main valve is arranged, the case member including the back-pressure chamber defined inside; an upstream-side back-pressure introducing passage configured to introduce the working fluid from the chamber on the upstream side into the back-pressure chamber; and a sub-valve to be seated on a first seat portion formed on an outer portion of the bottom portion of the case member, which is configured to define a first pressure-receiving chamber on an inner periphery side of the first seat portion, the first pressure-receiving chamber communicating with the back-pressure chamber, and to be opened by a pressure in the back-pressure chamber to apply a resistance force to the flow of the working fluid to the chamber on the downstream side, the shock absorber further including: a downstream-side back-pressure introducing passage defined in the bottom portion of the case member, which is configured to introduce the working fluid from the chamber on the upstream side with respect to flow of the working fluid, which is caused by movement of the piston in another direction, and is isolated from the first pressure-receiving chamber; a second seat portion formed on an inner side of the bottom portion of the case member, which is configured to define a second pressure-receiving chamber on an inner side, the second pressure-receiving chamber communicating with the downstream-side back-pressure introducing passage; and a check valve to be seated on the second seat portion, which is allowed to be opened by the working fluid from the downstream-side back-pressure introducing passage.

Further, according to one embodiment of the present invention, there is provided a shock absorber, including: a cylinder in which a working fluid is enclosed; a piston, which is slidably inserted into the cylinder, and is configured to partition an inside of the cylinder into two chambers; a piston rod, which is coupled to the piston, and extends to an outside of the cylinder; a passage in which flow of the working fluid is caused by movement of the piston in one direction; a main valve configured to apply a resistance force to flow of the working fluid in the passage from the chamber on an upstream side to the chamber on a downstream side; a back-pressure chamber configured to exert an internal pressure on the main valve in a valve-closing direction of the main valve; a case member having a bottomed cylindrical shape with an opening portion at one end, over which the main valve is arranged, the case member including the back-pressure chamber defined inside; an upstream-side back-pressure introducing passage configured to introduce the working fluid from the chamber on the upstream side into the back-pressure chamber; a sub-valve to be seated on an annular first seat portion formed on an outer portion of the bottom portion of the case member, which is configured to define a first pressure-receiving chamber on an inner periphery side of the first seat portion, the first pressure-receiving chamber communicating with the back-pressure chamber, and to be opened by a pressure in the back-pressure chamber to apply a resistance force to the flow of the working fluid to the chamber on the downstream side; a common passage configured to bring an extension-side back-pressure chamber and a compression-side back-pressure chamber into communication with each other; and a pilot control valve provided in the common passage, the shock absorber further including: a downstream-side back-pressure introducing passage defined in the bottom portion of the case member, which is configured to introduce the working fluid from the chamber on the upstream side with respect to flow of the working fluid, which is caused by movement of the piston in another direction, and is isolated from the first pressure-receiving chamber; a second seat portion formed on an inner side of the bottom portion of the case member, which is configured to define a second pressure-receiving chamber on an inner side, the second pressure-receiving chamber communicating with the downstream-side back-pressure introducing passage; and a check valve to be seated on the second seat portion, which is allowed to be opened by the working fluid from the downstream-side back-pressure introducing passage.

According to one embodiment of the present invention, a shock absorber can suppress a delay in response of a damping force.

DESCRIPTION OF EMBODIMENTS (First Embodiment) A first embodiment of the present invention is described with reference to the accompanying drawings.

Figure 1:
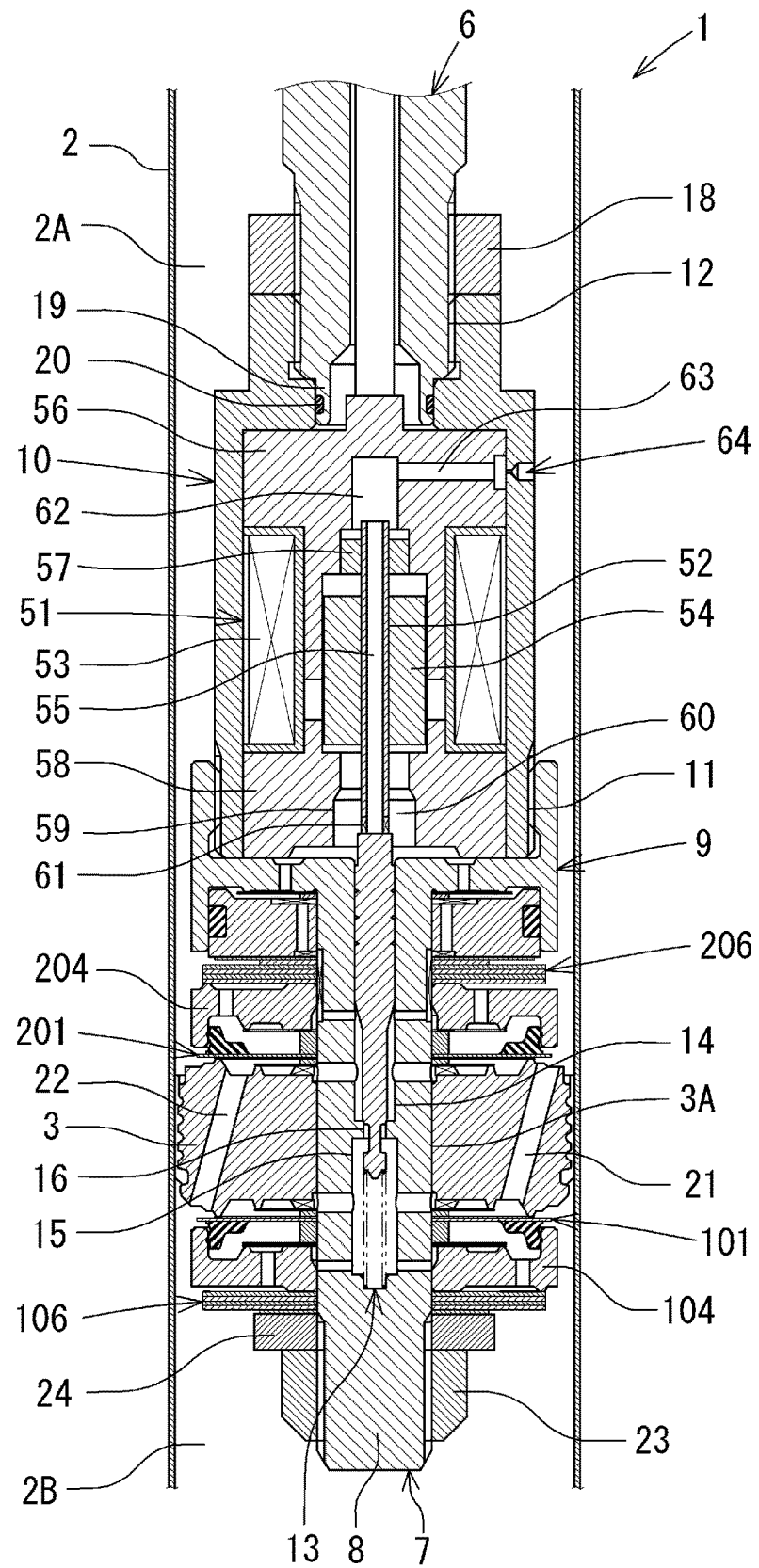
FIG. 1 is a sectional view of a main part of a shock absorber according to a first embodiment.

FIG. 1 is a sectional view of a main part of a shock absorber 1 according to the first embodiment. An upward direction (upper side) and a downward direction (lower side) in FIG. 1 are defined as an upward direction (upper side) and a downward direction (lower side) for the shock absorber 1. A single-cylinder damping-force adjusting hydraulic shock absorber is described in the first embodiment. However, the present invention is also applicable to a multi-cylinder damping-force adjusting hydraulic shock absorber including a reservoir.

As illustrated in FIG. 1, a piston 3 is slidably fitted in a cylinder 2. The piston 3 partitions an inside of the cylinder 2 into a cylinder upper chamber 2A and a cylinder lower chamber 2B. An oil liquid is enclosed as a working fluid in the cylinder upper chamber 2A and the cylinder lower chamber 2B. A free piston (not shown) is provided in the cylinder 2, and is movable in an upward and downward direction inside the cylinder 2. The free piston partitions the inside of the cylinder 2 into the cylinder lower chamber 2B on the piston 3 side (upper side) and a gas chamber (not shown) on a bottom portion side (lower side). Further, a high-pressure gas is enclosed as a working fluid in the gas chamber.

Figure 2:
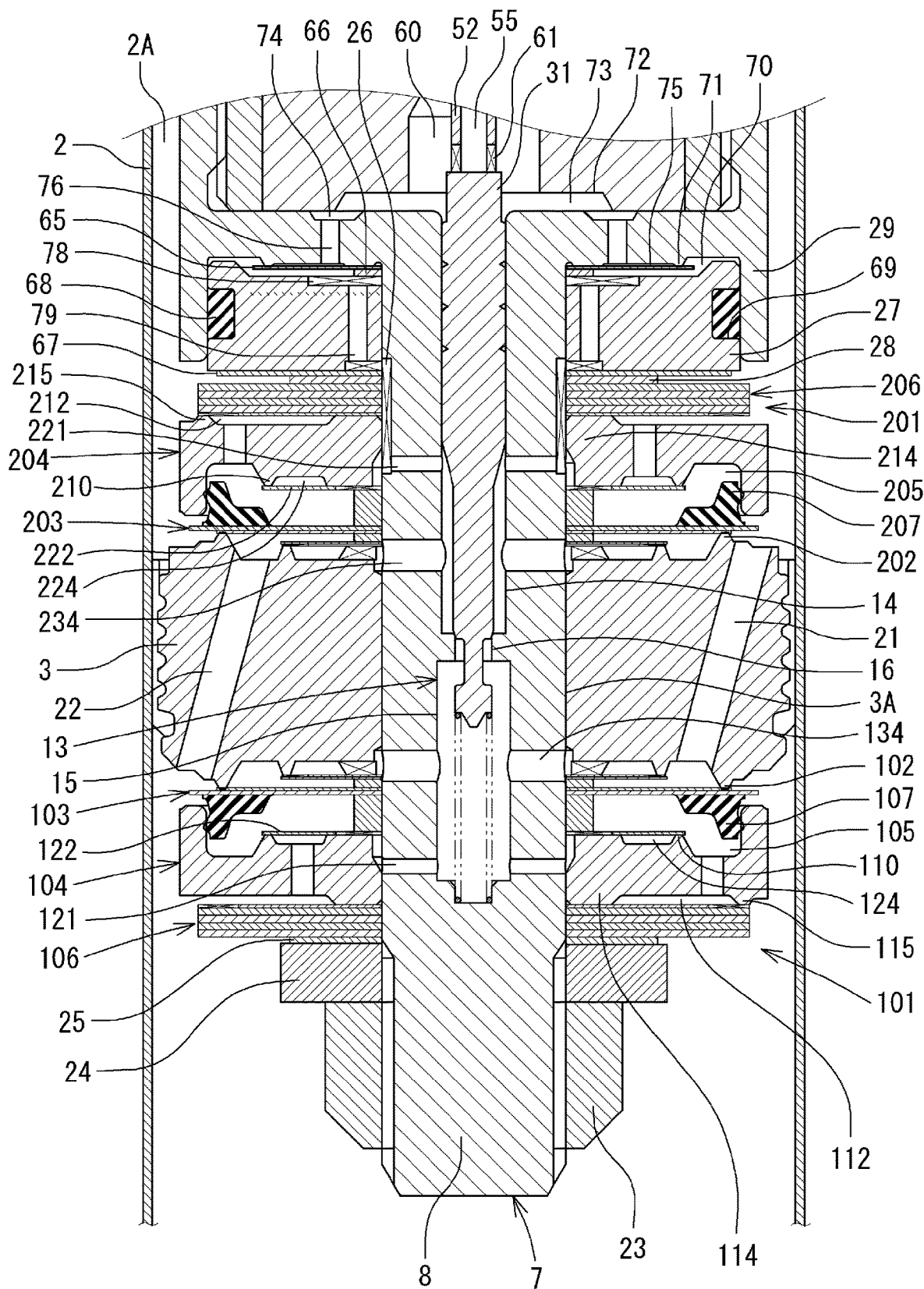
FIG. 2 is an enlarged view of a part of FIG. 1.

A shaft portion 8 of a piston bolt 7 is inserted into a shaft hole 3A of the piston 3. A lower end portion of a solenoid case 10 having a substantially cylindrical shape is connected to an upper portion of a head portion 9 of the piston bolt 7 through a threaded coupling portion 11. The head portion 9 has a substantially cylindrical shape. A common passage 13 is formed in the piston bolt 7. The common passage 13 is a bottomed shaft hole that extends toward a distal end side (lower side) along an axial direction (upward and downward direction) and has an upper end being open in a center of a bottom surface of the head portion 9. Referring to FIG. 2, the common passage 13 includes a shaft hole 14, a shaft hole 15, and a shaft hole 16. The shaft hole 14 is formed in an upper part of the common passage 13, and has an open upper end. The shaft hole 15 is formed in a lower part of the common passage 13 as a lower part thereof. The shaft hole 16 brings the shaft holes 14 and 15 into communication with each other. An inner diameter (hole diameter) of the common passage 13 is the largest at the shaft hole 15, and becomes smaller at the shaft hole 14 and the shaft hole 16 in the stated order.

As illustrated in FIG. 1, a lower end portion of a piston rod 6 is connected to an upper end portion of the solenoid case 10 through a threaded coupling portion 12. The piston rod 6 is inserted into a rod guide (not shown) mounted to an upper end portion of the cylinder 2. An upper end (another end) of the piston rod 6 extends from the cylinder 2 to an outside. A nut 18 is threadably fitted over the lower end portion of the piston rod 6. Loosening of the threaded coupling portion 12 can be restrained by bringing the nut 18 into abutment against the upper end of the solenoid case 10 and fastening the nut 18. The piston rod 6 has a small-diameter portion 19 at its lower end. An O-ring 20 is mounted in an annular groove formed in an outer peripheral surface of the small-diameter portion 19. The O-ring 20 is configured to seal a gap between the solenoid case 10 and the piston rod 6.

As illustrated in FIG. 2, the piston 3 has an extension-side passage 21 and a compression-side passage 22. The extension-side passage 21 has one end (upper end) that is open to the cylinder upper chamber 2A. The compression-side passage 22 has one end (lower end) that is open to the cylinder lower chamber 2B. An extension-side damping valve 101 (extension-side main valve mechanism) configured to control flow of a working fluid in the extension-side passage 21 is provided at a lower end of the piston 3. Meanwhile, a compression-side damping valve 201 (compression-side main valve mechanism) configured to control flow of the working fluid in the compression-side passage 22 is provided at an upper end of the piston 3.

The extension-side damping valve 101 includes a seat portion 102 having an annular shape, an extension-side main valve 103, a pilot case 104 (case member), and an extension-side back-pressure chamber 105. The seat portion 102 is formed on an outer periphery side of the lower end portion of the piston 3. The extension-side main valve 103 is seated on the seat portion 102. The pilot case 104 is fixed to the piston bolt 7 with a nut 23. The extension-side back-pressure chamber 105 is defined between a back surface of the extension-side main valve 103 and the pilot case 104. A pressure in the extension-side back-pressure chamber 105 acts so as to close the extension-side main valve 103.

A washer 24, a retainer 25, and a disc valve 106 are provided in the stated order from a lower side between the nut 23 and the pilot case 104. The disc valve 106 includes a plurality of discs. An inner peripheral portion of the disc valve 106 is sandwiched between an inner peripheral portion 114 of the pilot case 104 and the retainer 25. The extension-side main valve 103 is a packing valve provided with a sealing portion 107 (elastic sealing member) having an annular shape, which is formed of an elastic body. The sealing portion 107 is provided in contact with an inner peripheral surface of an annular wall portion 108 (cylindrical portion) of the pilot case 104 over its entire periphery.

Further, the sealing portion 107 is integrally and firmly fixed to the extension-side main valve 103.

Figure 3:
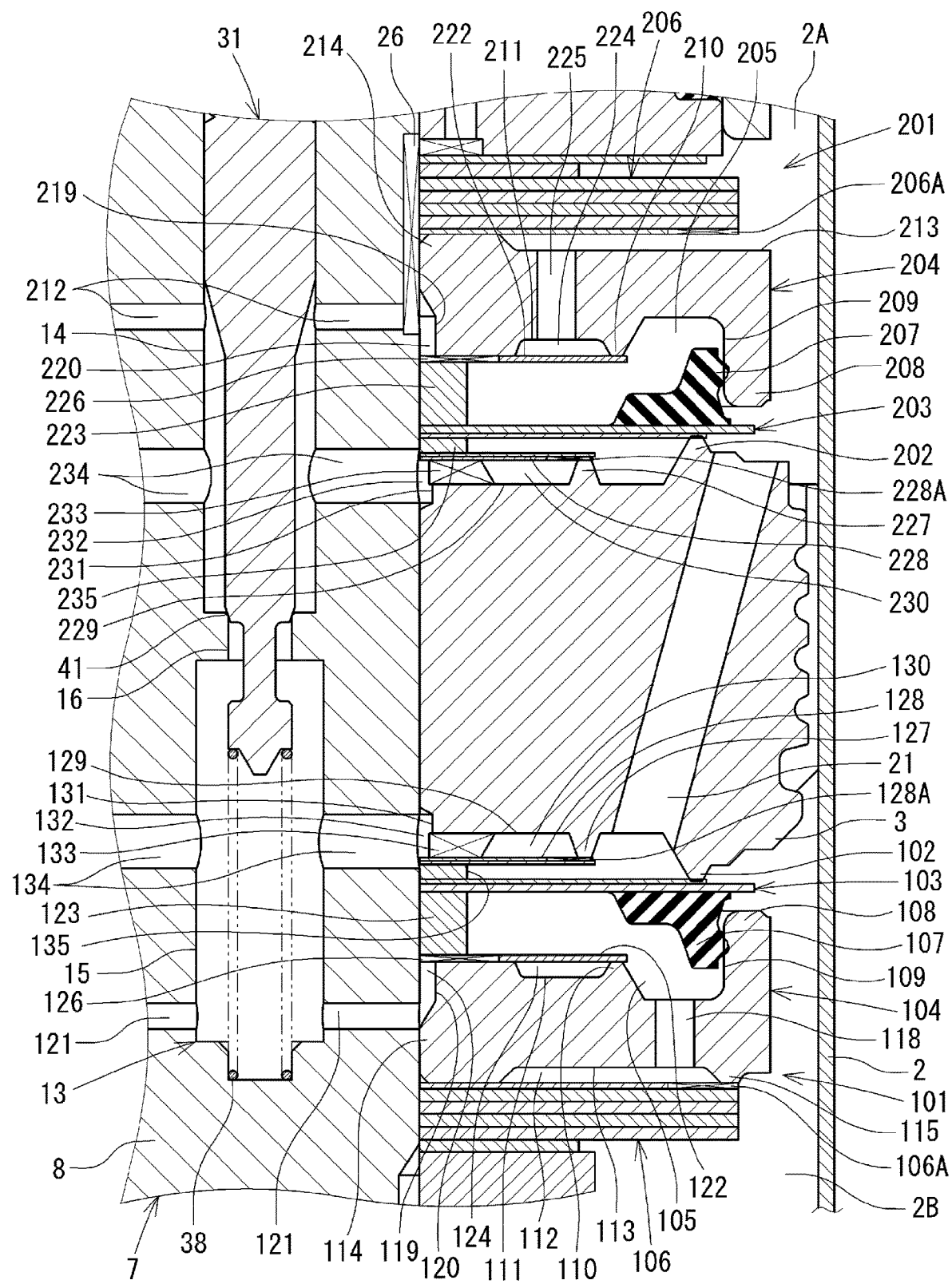
FIG. 3 is an enlarged view of a right part of FIG. 2.

As illustrated in FIG. 3, an annular recessed portion 109 extending along the annular wall portion 108 is formed in an upper end portion (bottom portion) of the pilot case 104. Further, an annular recessed portion 111 is formed in the upper end portion of the pilot case 104. The annular recessed portion 111 is adjacent to an inner peripheral side of the annular recessed portion 109 across a seat portion 110 (second seat portion) having an annular shape. The annular recessed portion 109 is formed to have a larger depth than that of the annular recessed portion 111 so as to ensure a movable range of the sealing portion 107 for the extension-side main valve 103.

Figure 4:
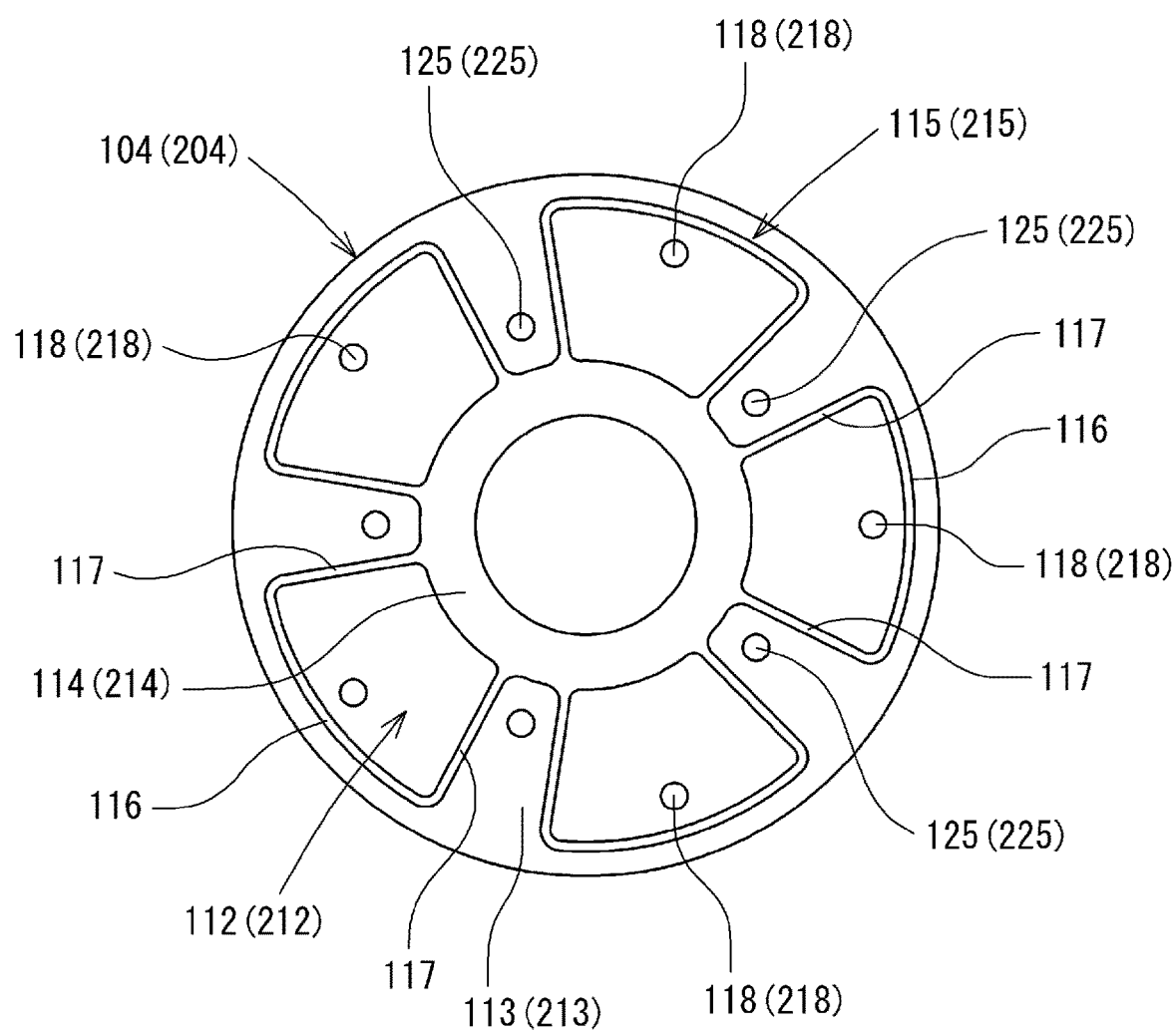
FIG. 4 is a view for illustrating a shape of a first seat portion of a pilot case to be used in the first embodiment, a third embodiment, and a fifth embodiment.

Referring to FIG. 2, FIG. 3, and FIG. 4, a plurality of (five in the first embodiment) first pressure-receiving chambers 112 are defined between the pilot case 104 and the disc valve 106. The first pressure-receiving chambers 112 are separated from each other by a seat portion 115 (first seat portion) having an irregular shape formed on a lower surface 113 (surface extending radially outward from the inner peripheral portion 114; see FIG. 2) of the pilot case 104. The seat portion 115 includes arc-shaped portions 116 (annular seat portions) and linear portions 117. The arc-shaped portions 116 extend along an outer periphery of the pilot case 104. The linear portions 117 extend in a radial direction to connect ends of the arc-shaped portions 116 and the inner peripheral portion 114 to each other. In this manner, five first pressure-receiving chambers 112, each being separated into a fan-like shape by the seat portion 115, are formed equi-angularly between the pilot case 104 of the extension-side damping valve 101 and the disc valve 106.

As illustrated in FIG. 3, the pilot case 104 has passages 118 (first passages) configured to bring the first pressure-receiving chambers 112 and the annular recessed portion 109 into communication with each other. Lower ends of the passages 118 are open on a part of the lower surface 113 of the pilot case 104, which is surrounded by the seat portion 115 (first seat portion). A large inner-diameter portion 119 having an open upper end is formed on the inner peripheral portion 114 (inner peripheral surface) of the pilot case 104. An annular passage 120 is defined between the large inner-diameter portion 119 and an outer peripheral surface of the shaft portion 8 of the piston bolt 7. The annular passage 120 communicates with the shaft hole 15 of the common passage 13 through a plurality of (two thereof are illustrated in FIG. 3) passages 121 formed in the shaft portion 8 of the piston bolt 7.

Figure 5:
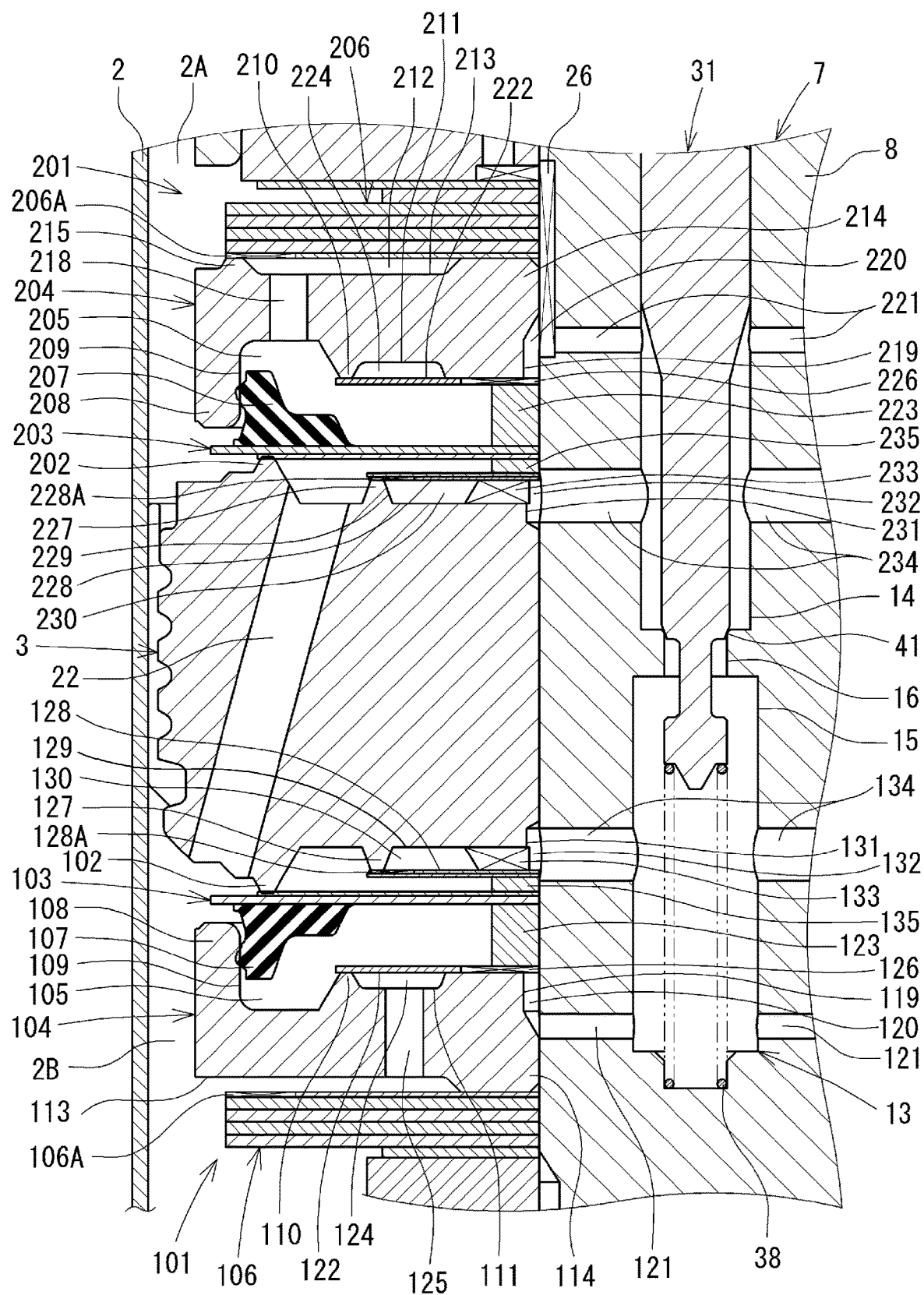
FIG. 5 is an enlarged view of a left part of FIG. 2.

A check valve 122 having a disc-like shape is provided so that an outer peripheral edge portion thereof is seated on the seat portion 110 (second seat portion) of the pilot case 104. The check valve 122 is a non-return valve configured to permit only flow of the working fluid from the cylinder lower chamber 2B to the extension-side back-pressure chamber 105. A second pressure-receiving chamber 124 having an annular shape, which is defined by the annular recessed portion 111 and the check valve 122, is formed on an inner periphery side of the seat portion 110. The second pressure-receiving chamber 124 is isolated from the first pressure-receiving chambers 112. As illustrated in FIG. 5, the second pressure-receiving chamber 124 communicates with the cylinder lower chamber 2B through a plurality of (five in the first embodiment) passages 125 (see FIG. 4) formed in the pilot case 104.

Referring to FIG. 5, during a compression stroke (during a reverse stroke, during movement of the piston 3 in another direction), an extension-side back-pressure holding passage (downstream-side back-pressure introducing passage) for introducing a pressure of the working fluid in the cylinder lower chamber 2B (chamber on the upstream side) via the passages 125, the second pressure-receiving chamber 124, and the check valve 122 into the extension-side back-pressure chamber 105 is defined. The extension-side back-pressure holding passage is isolated from the first pressure-receiving chambers 112. In this manner, the check valve 122 is opened during the compression stroke (during the reverse stroke) to introduce the pressure (working fluid) in the cylinder lower chamber 2B into the extension-side back-pressure chamber 105. In this manner, pressure leakage due to opening of the extension-side main valve 103, which may be caused by the pressure generated during the reverse stroke, can be restrained. The passages 125 have lower ends being open on the lower surface 113 of the pilot case 104, which are each located on an inner periphery side between the first pressure-receiving chambers 112 adjacent to each other. An inner peripheral portion of the check valve 122 is held between the inner peripheral portion 114 of the pilot case 104 and a spacer 123 fitted over the shaft portion 8 of the piston bolt 7.

The check valve 122 has a plurality of slits 126 (communication cutouts) extending from an inner periphery-side end portion in a radial direction. With the configuration described above, the extension-side back-pressure chamber 105 communicates with the shaft hole 15 of the common passage 13 via the slits 126 of the check valve 122, the annular passage 120 defined by the large inner-diameter portion 119 of the pilot case 104, and the passages 121 formed in the shaft portion 8 of the piston bolt 7. As a result, a volume of the extension-side back-pressure chamber 105 can be ensured when the extension-side main valve 103 is opened during the extension stroke (during a forward stroke in which the piston 3 moves in one direction).

Meanwhile, as illustrated in FIG. 3, a seat portion 127 having an annular shape is formed at the lower end portion of the piston 3. The seat portion 127 is located on an inner periphery side of the seat portion 102, and has a smaller height (projecting length) than a height of the seat portion 102 from a lower surface of the piston 3. A lower end of the extension-side passage 21 is open on an annular surface of the lower end portion of the piston 3, which is defined between the seat portion 102 and the seat portion 127. An outer peripheral edge portion of a disc valve 128 is seated on the seat portion 127. An annular recessed portion 129 is formed between an inner peripheral portion and the seat portion 127 of the piston 3. The lower end portion of the piston 3 has an annular passage 130 defined by the annular recessed portion 129 and the disc valve 128.

The shaft hole 3A of the piston 3 has a large inner-diameter portion 131 having an open lower end. An annular passage 132 is defined between the large inner-diameter portion 131 and an outer peripheral surface of the shaft portion 8 of the piston bolt 7. The inner peripheral portion of the piston 3 has a plurality of passages 133 configured to bring the annular passage 130 and the annular passage 132 into communication with each other. The shaft portion 8 of the piston bolt 7 has a plurality of (two passages are illustrated in FIG. 3) passages 134 configured to bring the shaft hole 15 of the common passage 13 and the annular passage 132 of the piston 3 into communication with each other. An inner peripheral portion of the disc valve 128 is held between the inner peripheral portion of the piston 3 and a retainer 135.

During the extension stroke (during the forward stroke), an extension-side back-pressure introducing passage (upstream-side back-pressure introducing passage) configured to introduce a pressure of the working fluid in the cylinder upper chamber 2A (chamber on the upstream side) via the extension-side passage 21, an orifice 128A formed in the disc valve 128, the annular passage 130, the passages 133, the annular passage 132, the passages 134, the shaft hole 15, the passages 121, the annular passage 120, and the slits 126 of the check valve 122 into the extension-side back-pressure chamber 105 is defined.

Next, the compression-side damping valve 201 is described. As illustrated in FIG. 2, the compression-side damping valve 201 includes a seat portion 202 having an annular shape, a compression-side main valve 203, a pilot case 204 (case member), and a compression-side back-pressure chamber 205. The seat portion 202 is formed on an outer periphery side of the upper end portion of the piston 3. The compression-side main valve 203 is seated on the seat portion 202. The pilot case 204 is fixed to the piston bolt 7. The compression-side back-pressure chamber 205 is defined between a back surface of the compression-side main valve 203 and the pilot case 204. A pressure in the compression-side back-pressure chamber 205 acts so as to close the compression-side main valve 203.

A disc valve 206 is provided between a washer 27 and the pilot case 204. An inner peripheral portion of the disc valve 206 is sandwiched between an inner peripheral portion 214 of the pilot case 204 and a retainer 28. The compression-side main valve 203 is a packing valve provided with a sealing portion 207 (elastic sealing member) having an annular shape, which is formed of an elastic body. The sealing portion 207 is provided in contact with an inner peripheral surface of an annular wall portion 208 (cylindrical portion) of the pilot case 204 over its entire periphery. Further, the sealing portion 207 is integrally and firmly fixed to the compression-side main valve 203.

As illustrated in FIG. 5, an annular recessed portion 209 extending along the annular wall portion 208 is formed in a lower end portion of the pilot case 204. Further, an annular recessed portion 211 is formed in the lower end portion (bottom portion) of the pilot case 204. The annular recessed portion 211 is adjacent to an inner peripheral side of the annular recessed portion 209 across a seat portion 210 (second seat portion) having an annular shape. The annular recessed portion 209 is formed to have a larger depth than that of the annular recessed portion 211 so as to ensure a movable range of the sealing portion 207 for the compression-side main valve 203.

Referring to FIG. 2, FIG. 4, and FIG. 5, a plurality of (five in the first embodiment) first pressure-receiving chambers 212 are defined between the pilot case 204 and the disc valve 206. The first pressure-receiving chambers 212 are separated from each other by a seat portion 215 (first seat portion) having an irregular shape formed on an upper surface 213 (surface extending radially outward from the inner peripheral portion 214) of the pilot case 204. The seat portion 215 includes arc-shaped portions 216 (annular seat portions) and linear portions 217. The arc-shaped portions 216 extend along an outer periphery of the pilot case 204. The linear portions 217 extend in a radial direction to connect ends of the arc-shaped portions 216 and an inner peripheral portion 214 to each other. In this manner, five first pressure-receiving chambers 212, each being separated into a fan-like shape by the seat portion 215, are formed equiangularly between the pilot case 204 of the compression-side damping valve 201 and the disc valve 206.

As illustrated in FIG. 5, the pilot case 204 has passages 218 (first passages) configured to bring the first pressure-receiving chambers 212 and the annular recessed portion 209 into communication with each other. Upper ends of the passages 218 are open on a part of the upper surface 213 of the pilot case 204, which is surrounded by the seat portion 215 (first seat portion). A large inner-diameter portion 219 having an open lower end is formed on the inner peripheral portion 214 (inner peripheral surface) of the pilot case 204. An annular passage 220 is defined between the large inner-diameter portion 219 and an outer peripheral surface of the shaft portion 8 of the piston bolt 7. The annular passage 220 communicates with the shaft hole 14 of the common passage 13 via a plurality of (one thereof is illustrated in FIG. 5) grooves 26 and a plurality of (two thereof are illustrated in FIG. 5) passages 221. The grooves 26 extending in the axial direction are formed in the outer peripheral surface of the shaft portion 8 of the piston bolt 7. The passages 221 are formed in the shaft portion 8 of the piston bolt 7.

A check valve 222 having a disc-like shape is provided so that an outer peripheral edge portion thereof is seated on the seat portion 210 (second seat portion) of the pilot case 204. The check valve 222 is a non-return valve configured to permit only flow of the working fluid from the cylinder lower chamber 2B to the compression-side back-pressure chamber 205. A second pressure-receiving chamber 224 having an annular shape, which is defined by the annular recessed portion 211 and the check valve 222, is formed on an inner periphery side of the seat portion 210. The second pressure-receiving chamber 224 is isolated from the first pressure-receiving chambers 212. As illustrated in FIG. 3, the second pressure-receiving chamber 224 communicates with the cylinder lower chamber 2B through a plurality of (five in the first embodiment) passages 225 formed in the pilot case 204.

Referring to FIG. 3, during an extension stroke (during a reverse stroke), a compression-side back-pressure holding passage (downstream-side back-pressure introducing passage) for introducing a pressure of the working fluid in the cylinder upper chamber 2A (chamber on the upstream side) via the passages 225, the second pressure-receiving chamber 224, and the check valve 222 into the compression-side back-pressure chamber 205 is defined. The compression-side back-pressure holding passage is isolated from the first pressure-receiving chambers 212. In this manner, the check valve 222 is opened during the extension stroke (during the reverse stroke) to introduce the pressure (working fluid) in the cylinder upper chamber 2A into the compression-side back-pressure chamber 205. In this manner, pressure leakage due to opening of the compression-side main valve 203, which may be caused by the pressure generated during the reverse stroke, can be restrained. The passages 225 have upper ends being open on the upper surface 213 of the pilot case 204, which are each located on an inner periphery side between the first pressure-receiving chambers 212 adjacent to each other. An inner peripheral portion of the check valve 222 is held between the inner peripheral portion 214 of the pilot case 204 and a spacer 223 fitted over the shaft portion 8 of the piston bolt 7.

As illustrated in FIG. 5, the check valve 222 has a plurality of slits 226 (communication cutouts) extending from an inner periphery-side end portion in a radial direction. With the configuration described above, the compression-side back-pressure chamber 205 communicates with the shaft hole 14 of the common passage 13 (extension pressure common passage) via the slits 226 of the check valve 222, the annular passage 220 defined by the large inner-diameter portion 219 of the pilot case 204, the grooves 26 formed in the shaft portion 8 of the piston bolt 7, and the passages 221 formed in the shaft portion 8 of the piston bolt 7. As a result, a volume of the compression-side back-pressure chamber 205 can be ensured when the compression-side main valve 203 is opened during the compression stroke (during a forward stroke).

Meanwhile, a seat portion 227 having an annular shape is formed at the upper end portion of the piston 3. The seat portion 227 is located on an inner periphery side of the seat portion 202, and has a smaller height (projecting length) than a height of the seat portion 202 from an upper surface of the piston 3. An upper end of the compression-side passage 22 is open on an annular surface of the upper end portion of the piston 3, which is defined between the seat portion 202 and the seat portion 227. An outer peripheral edge portion of a disc valve 228 is seated on the seat portion 227. An annular recessed portion 229 is formed between an inner peripheral portion and the seat portion 227 of the piston 3. The upper end portion of the piston 3 has an annular passage 230 defined by the annular recessed portion 229 and the disc valve 228.

The shaft hole 3A of the piston 3 has a large inner-diameter portion 231 having an open upper end. An annular passage 232 is defined between the large inner-diameter portion 231 and an outer peripheral surface of the shaft portion 8 of the piston bolt 7. The inner peripheral portion of the piston 3 has a plurality of passages 233 configured to bring the annular passage 230 and the annular passage 232 into communication with each other. The shaft portion 8 of the piston bolt 7 has a plurality of (two passages are illustrated in FIG. 3) passages 234 configured to bring the shaft hole 14 of the common passage 13 and the annular passage 232 of the piston 3 into communication with each other. An inner peripheral portion of the disc valve 228 is held between the inner peripheral portion of the piston 3 and a retainer 235.

During the compression stroke (during the forward stroke), a compression-side back-pressure introducing passage (upstream-side back-pressure introducing passage) configured to introduce a pressure of the working fluid in the cylinder lower chamber 2B (chamber on the upstream side) via the compression-side passage 22, an orifice 228A formed in the disc valve 228, the annular passage 230, the passages 233, the annular passage 232, the passages 234, the shaft hole 14, the passages 221, the grooves 26 formed in the shaft portion 8 of the piston bolt 7, the annular passage 220, and the slits 226 of the check valve 222 into the compression-side back-pressure chamber 205 is defined.

Flow of the working fluid in the common passage 13 of the piston bolt 7 is controlled by a pilot control valve. As illustrated in FIG. 2, a pilot valve includes a valve spool 31 (valve body) slidably fitted into the common passage 13. The valve spool 31 is formed of a solid shaft, and forms the pilot valve together with the piston bolt 7. The valve spool 31 includes a base portion 32, a valve portion 34, a distal end portion 35 (fitting portion), and a connecting portion 36. The base portion 32 is to be slidably fitted to an upper portion of the shaft hole 14, in other words, a portion of the shaft hole 14 above the passages 221. The valve portion 34 is located inside the shaft hole 14, and is continuous with the base portion 32 through a tapered portion 33. The distal end portion 35 is located inside the shaft hole 15 when the pilot valve is closed (see FIG. 2). The connecting portion 36 is located between the distal end portion 35 and the valve portion 34. An outer diameter of the valve spool 31 is the largest at the base portion 32, and becomes smaller at the valve portion 34, the distal end portion 35, and the connecting portion 36 in the stated order. Further, an outer diameter of the valve portion 34 is larger than an inner diameter of the shaft hole 16.

Figure 6:
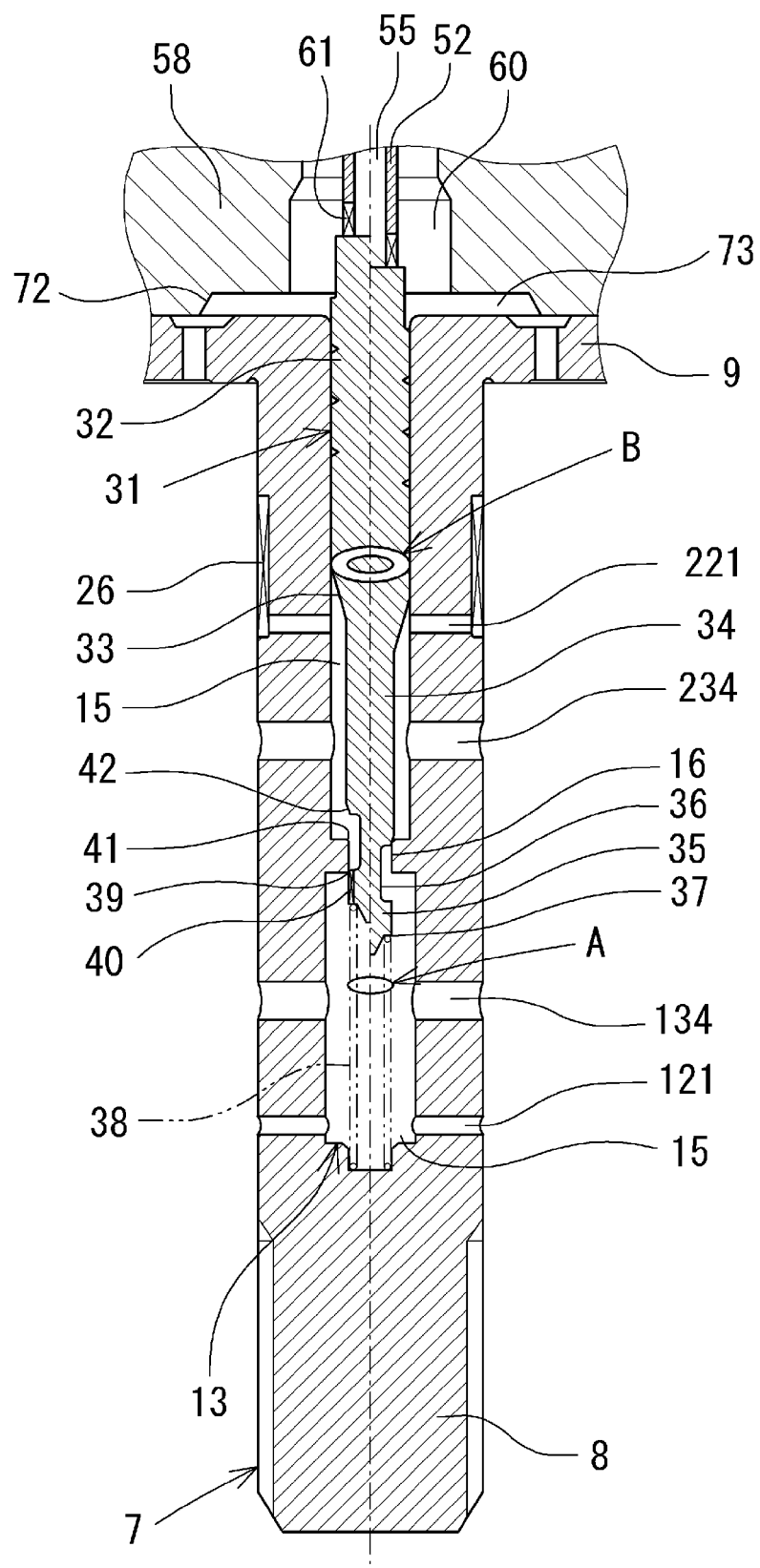
FIG. 6 is an explanatory view of an operation of a pilot valve according to the first embodiment, in which the pilot valve in a valve-open state is illustrated on a right side of a center line and the pilot valve in a valve-closed state is illustrated on a left side of the center line.

The valve spool 31 is urged by a valve spring 38 in the upward direction with respect to the piston bolt 7. The valve spring 38 is provided between a spring receiving portion 37 of the distal end portion 35 and a bottom portion of the shaft hole 15 of the piston bolt 7. In this manner, an end surface of the base portion 32 of the valve spool 31 is brought into abutment against (pressed against) a rod 52 of a solenoid 51 that is to be used as an actuator configured to control movement of the valve spool 31. Referring to FIG. 6, the distal end portion 35 of the valve spool 31 is formed so that its cross section taken along a plane at a right angle with respect to an axis (one plane perpendicular to an axis of the valve spool 31) has a circular shape with cutouts 39 having two flat parallel surfaces. When a control current for the solenoid 51 is 0 A (at a time of failure), the valve spool 31 is stroked in a valve-opening direction (upward direction in FIG. 6) to fit the distal end portion 35 into the shaft hole 16. As a result, a pair of orifices 40 configured to bring the shaft holes 15 and 14 into communication with each other are defined between the distal end portion 35 and the shaft hole 16.

A seat portion 41 having an annular shape, on which the valve portion 34 of the valve spool 31 is to be seated, is formed at a peripheral edge portion of an opening at an upper end (end on the shaft hole 14 side) of the shaft hole 16. A seating portion 42 having a tapered shape is formed on an outer peripheral edge portion of a lower end (end on the connecting portion 36 side) of the valve portion 34. Under a state in which the seating portion 42 of the valve spool 31 is seated on the seat portion 41 located in the common passage 13 of the piston bolt 7, specifically, under a valve-closed state of the pilot valve, the distal end portion 35 of the valve spool 31 is subjected to a pressure on the shaft hole 15 side via a pressure-receiving surface A having a substantially circular shape (see FIG. 6), and the tapered portion 33 thereof is subjected to a pressure on the shaft hole 14 side via a pressure-receiving surface B having an annular shape (see FIG. 6).

As illustrated in FIG. 1, the solenoid 51 includes the solenoid case 10, a rod 52, and a coil 53. A plunger 54 is coupled to an outer peripheral surface of the rod 52. The plunger 54, which is also referred to as "movable core", is formed of an iron-based magnetic body into a substantially cylindrical shape. The plunger 54 generates a thrust with a magnetic force generated by energization of the coil 53. The rod 52 is formed in a cylindrical shape. A rod inner passage 55 passing and extending through the rod 52 in the axial direction (upward and downward direction) is formed (inside the shaft hole) in the rod 52. The rod 52 is supported movably in the upward and downward direction (axial direction) by a bush 57 built in a stator core 56.

A spool back-pressure chamber 60 (chamber) is defined inside a shaft hole 59 of the stator core 58 of the solenoid 51. An upper end of the valve spool 31 and a lower end of the rod 52 are in abutment against each other in the spool back-pressure chamber 60 of the pilot valve. When the pilot valve is closed, the spool back-pressure chamber 60 is brought into communication with the cylinder upper chamber 2A through an upper chamber-side communication path. The upper chamber-side communication path includes a cutout 61, the rod inner passage 55, a rod back-pressure chamber 62, a passage 63, and an air-vent orifice 64. The cutout 61 is formed in a distal end portion (lower end portion) of the rod 52. The rod back-pressure chamber 62 is defined inside the stator core 56. The passage 63 extends in a radial direction inside the stator core 56, and is configured to bring the rod back-pressure chamber 62 and an outer peripheral surface of the stator core 56 into communication with each other. The air-vent orifice 64 is formed in a side wall of the solenoid case 10.

As illustrated in FIG. 2, a spool back-pressure relief valve 65 (non-return valve) having a disc-like shape, a retainer 66, the washer 27, a disc 67, the retainer 28, and the disc valve 206 are arranged in the stated order from the upper side between the head portion 9 of the piston bolt 7 and the pilot case 204. An outer peripheral surface of the washer 27 is fitted into an inner peripheral surface of a lower part of an annular wall portion 29 of the head portion 9 of the piston bolt 7. An annular groove 69 into which an O-ring 68 is to be mounted is formed in the outer peripheral surface of the washer 27. The O-ring 68 is configured to seal a gap between the washer 27 and the annular wall portion 29 of the head portion 9 of the piston bolt 7, in other words, a gap between a circumferential groove 70 described later and the cylinder upper chamber 2A in a liquid tight manner.

The spool back-pressure relief valve 65 has an inner peripheral portion sandwiched between the retainer 66 and an inner peripheral portion of the head portion 9 of the piston bolt 7, and has an outer peripheral edge portion seated on a seat portion 71 having an annular shape. The seat portion 71 is formed on a lower surface of the head portion 9 of the piston bolt 7. The above-mentioned circumferential groove 70 to be used for a movable range for allowing opening of the spool back-pressure relief valve 65 is formed between the head portion 9 of the piston bolt 7 and the washer 27. The spool back-pressure relief valve 65 is a non-return valve, which permits only flow of the working fluid from the spool back-pressure chamber 60 into the circumferential groove 70.

The spool back-pressure chamber 60 communicates with the cylinder lower chamber 20B via a lower chamber-side communication path (communication path). The lower chamber-side communication path includes a circumferential groove 73. The circumferential groove 73 is formed around the valve spool 31 (base portion 32) between a recessed portion 72 formed in a lower surface of the stator core 58 and the head portion 9 of the piston bolt 7. The lower chamber-side communication path includes an annular groove 74, an annular groove 75, and passages 76. The annular groove 74 is formed in an upper surface of the head portion 9 of the piston bolt 7. The annular groove 75 is located on an inner side of the seat portion 71, and is defined by the spool back-pressure relief valve 65. The passages 76 pass and extend through the head portion 9 of the piston bolt 7 in the upward and downward direction, and are configured to bring the annular grooves 74 and 75 into communication with each other. With the configuration described above, the spool back-pressure chamber 60 communicates with the circumferential groove 70 via the circumferential groove 73, the annular groove 74, the passages 76, the annular groove 75, and the spool back-pressure relief valve 65.

The lower chamber-side communication path includes grooves 77, grooves 78, passages 79, and the grooves 26. The grooves 77 are formed in an upper surface of the washer 27, and extend radially outward from an inner peripheral surface of the washer 27. The grooves 78 are formed in a lower surface of the washer 27, and extend radially outward from the inner peripheral surface of the washer 27. The passages 79 pass and extend through the washer 27 in the upward and downward direction, and are configured to bring the grooves 77 and 78 into communication with each other. The grooves 26 are configured to bring the grooves 78 and the passages 221 in the shaft portion 8 of the piston bolt 7 into communication with each other. With the configuration described above, the circumferential groove 70 communicates with the shaft hole 14 of the common passage 13 via the grooves 77, the passages 79, the grooves 78, the grooves 26, and the passages 221. The grooves 26 are formed by processing the shaft portion 8 of the piston bolt 7 to form two flat parallel surfaces thereon.

Next, flow of the working fluid is described.

Referring to FIG. 5, during the compression stroke of the piston rod 6 (hereinafter referred to as "during the compression stroke"), before the compression-side main valve 203 is opened, the working fluid in the cylinder lower chamber 2B passes through the compression-side passage 22, the orifice 228A, the annular passage 230, the passages 233, the annular passage 232, the passages 234, the shaft hole 14, the passages 221, the grooves 26, the annular passage 220, the slits 226 (communication cutouts), the compression-side back-pressure chamber 205, the passages 218, the first pressure-receiving chamber 212, and an orifice 206A of the disc valve 206 to flow into the cylinder upper chamber 2A.

Then, when the valve spool 31 (valve body) is moved to separate the valve portion 34 from the seat portion 41, specifically, the pilot valve is opened (see FIG. 6), the working fluid in the cylinder lower chamber 2B passes through the compression-side passage 22, the orifice 228A, the annular passage 230, the passages 233, the annular passage 232, the passages 234, the common passage 13, the passages 134, the annular passage 132, the passages 133, the annular passage 130, the disc valve 128, and the extension-side passage 21 to flow into the cylinder upper chamber 2A. In this case, a valve-opening pressure for the pilot valve can be adjusted by controlling a current that is caused to flow through the coil 53 of the solenoid 51. At the same time, a pressure of the working fluid to be introduced through the check valve 222 (compression-side back-pressure introduction valve) into the compression-side back-pressure chamber 205 is also adjusted (function as a back-pressure adjustment mechanism). Thus, a valve-opening pressure for the compression-side main valve 203 can be controlled.

Referring to FIG. 3, during the extension stroke of the piston rod 6 (hereinafter referred to as "during the extension stroke"), before the extension-side main valve 103 is opened, the working fluid in the cylinder upper chamber 2A passes through the extension-side passage 21, the orifice 128A, the annular passage 130, the passages 133, the annular passage 132, the passages 134, the shaft hole 15, the passages 121, the annular passage 120, the slits 126 (communication cutouts), the extension-side back-pressure chamber 105, the passages 118, the first pressure-receiving chamber 112, and an orifice 106A of the disc valve 106 to flow into the cylinder lower chamber 2B.

Then, when the valve spool 31 (valve body) is moved to separate the valve portion 34 from the seat portion 41, specifically, the pilot valve is opened (see FIG. 6), the working fluid in the cylinder upper chamber 2A passes through the extension-side passage 21, the orifice 128A, the annular passage 130, the passages 133, the annular passage 132, the passages 134, the common passage 13, the passages 234, the annular passage 232, the passages 233, the annular passage 230, the disc valve 228, and the compression-side passage 22 to flow into the cylinder lower chamber 2B. In this case, a valve-opening pressure for the pilot valve can be adjusted by controlling a current that is caused to flow through the coil 53 of the solenoid 51. At the same time, a pressure of the working fluid to be introduced through the check valve 122 (extension-side back-pressure introduction valve) into the extension-side back-pressure chamber 105 is also adjusted (function as a back-pressure adjustment mechanism). Thus, a valve-opening pressure for the extension-side main valve 103 can be controlled.

Meanwhile, during the extension stroke, the working fluid in the cylinder upper chamber 2A passes through the upper chamber-side communication path to flow into the spool back-pressure chamber 60 (chamber). Specifically, after being constricted through the air-vent orifice 64, the working fluid in the cylinder upper chamber 2A passes through the passage 63, the rod back-pressure chamber 62, the rod inner passage 55, and the cutout 61 of the rod 52 to flow into the spool back-pressure chamber 60. Further, the working fluid, which has flowed into the spool back-pressure chamber 60, passes through the lower chamber-side communication path (communication path) to flow into the cylinder lower chamber 2B. Specifically, the working fluid, which has flowed into the spool back-pressure chamber 60, passes through the circumferential groove 73, the annular groove 74, the passages 76, the annular groove 75, the spool back-pressure relief valve 65 (non-return valve), the circumferential groove 70, the passages 77, the passages 79, the grooves 78, the grooves 26, the passages 221, the shaft hole 14 (common passage 13), the passages 234, the annular passage 232, the passages 233, the annular passage 230, the orifice 228A, and the compression-side passage 22 to flow into the cylinder lower chamber 2B.

In the shock absorber as described in Patent Literature 1 cited above (hereinafter referred to as "related-art shock absorber"), the passage that brings the back-pressure chamber and the downstream-side chamber into communication with each other is directly closed by the check valve that is provided so as to overlap with the relief valve. Thus, during the reverse stroke, a delay in opening of the check valve occurs due to sticking of the check valve to the relief valve. As a result, there arises a problem in that a delay in response of the damping force may occur. Further, in the related-art shock absorber, during the forward stroke, a volume is not ensured at the time when the main valve is opened, specifically, the working fluid cannot be quickly discharged from the back-pressure chamber. Thus, there is a fear in that overshoot of the damping force may occur.

Meanwhile, the shock absorber according to the first embodiment includes the first pressure-receiving chambers 112, 212 and the second pressure-receiving chamber 124, 224. The first pressure-receiving chambers 112, 212 communicates with the back-pressure chamber 105, 205. The second pressure-receiving chamber 124, 224 is isolated from the first pressure-receiving chambers 112, 212, and communicates with the downstream-side back-pressure introducing passage. The check valve 122, 222 configured to be opened by the working fluid flowing from the downstream-side back-pressure introducing passage is seated on the seat portion 110, 210 (second seat portion) that defines the second pressure-receiving chamber 124, 224. In other words, the check valve 122, 222 (downstream-side back-pressure introduction non-return valve), which permits only flow of the working fluid from the chamber 2B, 2A on the downstream side to the back-pressure chamber 105, 205 during the reverse stroke, and the disc valve 106, 206 (sub-valve), which is opened by the pressure in the back-pressure chamber 105, 205 to apply a resistance force to the flow of the working fluid from the back-pressure chamber 105, 205 to the chamber 2B, 2A on the downstream side during the forward stroke, are provided as different systems.

With the configuration described above, during the reverse stroke, the check valve 122, 222 seated on the annular seat portion 110, 210 (second seat portion) can be quickly opened. Hence, the working fluid in the chamber 2B, 2A on the downstream side can be quickly introduced into the back-pressure chamber 105, 205. Thus, a delay in response of the damping force, which may be caused by sticking of the check valve 122, 222 to the relief valve (disc valve 106, 206), can be suppressed.

Further, in the first embodiment, the back-pressure chamber 105, 205 communicates with the shaft hole 15, 14 (common passage 13) via the slits 126, 226 (communication cutouts) formed in the check valve 122, 222. Thus, during the forward stroke, the volume of the back-pressure chamber 105, 205 when the main valve 103, 203 is opened can be ensured. Thus, the overshoot of the damping force, which has been a problem in the related-art shock absorber, can be restrained.

Further, in the related-art shock absorber, pressure leakage from the back-pressure chamber during the forward stroke has been a problem. The pressure leakage may be caused by flow of the working fluid, which has been introduced into the back-pressure chamber via the upstream-side back-pressure introducing passage, through a gap defined by a level difference between the check valve and the disc valve. In the first embodiment, the above-mentioned problems can be restrained.

Now, actions and effects of the first embodiment are described.

In the first embodiment, the shock absorber includes: a cylinder in which a working fluid is enclosed; a piston, which is slidably inserted into the cylinder, and is configured to partition an inside of the cylinder into two chambers; a piston rod, which is coupled to the piston, and extends to an outside of the cylinder; a passage in which flow of the working fluid is caused by movement of the piston in one direction (during a forward stroke); a main valve configured to apply a resistance force to flow of the working fluid in the passage from the chamber on an upstream side to the chamber on a downstream side; a back-pressure chamber configured to exert an internal pressure on the main valve in a valve-closing direction of the main valve; a case member having a bottomed cylindrical shape including a cylindrical portion and a bottom portion each having an opening portion at one end, over which the main valve is arranged, the case member including the back-pressure chamber defined inside; an upstream-side back-pressure introducing passage configured to introduce the working fluid from the chamber on the upstream side into the back-pressure chamber; and a sub-valve to be seated on an annular first seat portion formed on an outer portion of the bottom portion of the case member, which is configured to define a first pressure-receiving chamber on an inner periphery side of the first seat portion, the first pressure-receiving chamber communicating with the back-pressure chamber, and to be opened by a pressure in the back-pressure chamber to apply a resistance force to the flow of the working fluid to the chamber on the downstream side, the shock absorber further including: a downstream-side back-pressure introducing passage defined in the bottom portion of the case member, which is configured to introduce the working fluid from the chamber on the upstream side with respect to flow of the working fluid, which is caused by movement of the piston in another direction, and is isolated from the first pressure-receiving chamber; a second seat portion formed on an inner side of the bottom portion of the case member, which is configured to define a second pressure-receiving chamber on an inner side, the second pressure-receiving chamber communicating with the downstream-side back-pressure introducing passage; and a check valve to be seated on the second seat portion, which is allowed to be opened by the working fluid from the downstream-side back-pressure introducing passage.

According to the first embodiment, when the piston moves in the another direction (during the reverse stroke), the check valve seated on the second seat portion can be quickly opened. Thus, a delay in response of the damping force, which may be caused by sticking of the check valve to the disc valve, can be restrained.

Further, in the first embodiment, the pressure leakage from the back-pressure chamber during the forward stroke, which has occurred in the related-art shock absorber, can be restrained. The pressure leakage may be caused by the flow of the working fluid, which has been introduced into the back-pressure chamber via the upstream-side back-pressure introducing passage, through the gap defined by the level difference between the check valve and the disc valve.

In the first embodiment, the shock absorber includes the extension-side main valve mechanism and the compression-side main valve mechanism, and has the back-pressure adjustment mechanism configured to adjust the back pressures in the extension-side back-pressure chamber and the compression-side back-pressure chamber with use of the common control valve. The check valve has the communication cutouts configured to bring the back-pressure chamber and the common passage into communication with each other. Thus, during the forward stroke, the volume of the main valve when the main valve is opened can be ensured. Thus, the overshoot of the damping force can be restrained.

In the first embodiment, the elastic sealing member configured to seal the back-pressure chamber is provided on the outer peripheral portion of the surface of the main valve, which is located on the back-pressure chamber side. Thus, the back-pressure chamber can be sealed in a liquid-tight manner.

Further, in the first embodiment, the elastic sealing member is integrally and firmly fixed to the main valve. Thus, ease of assembly can be improved.

Figure 7:
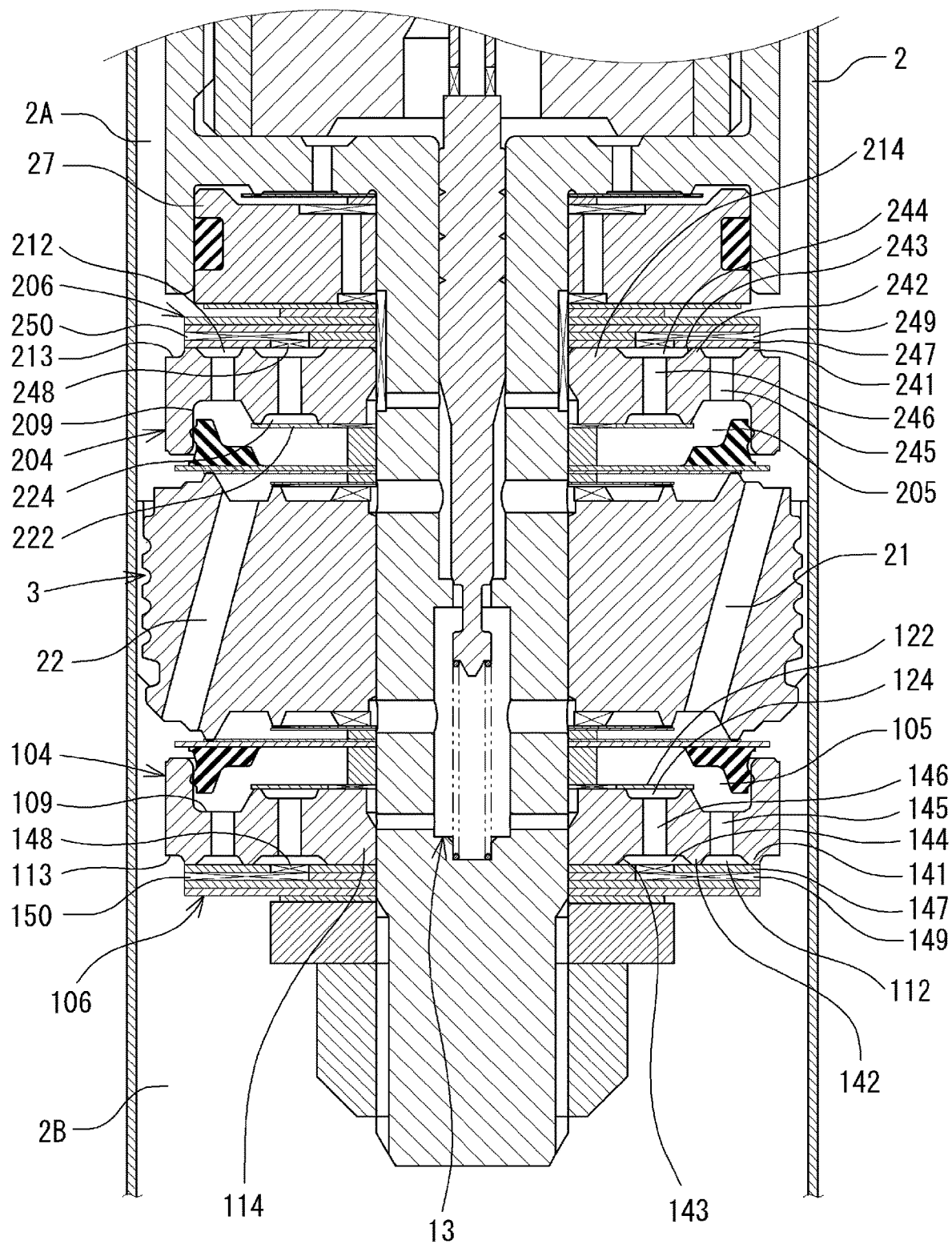
FIG. 7 is an explanatory view of the second embodiment, which corresponds to FIG. 2.
Figure 8:
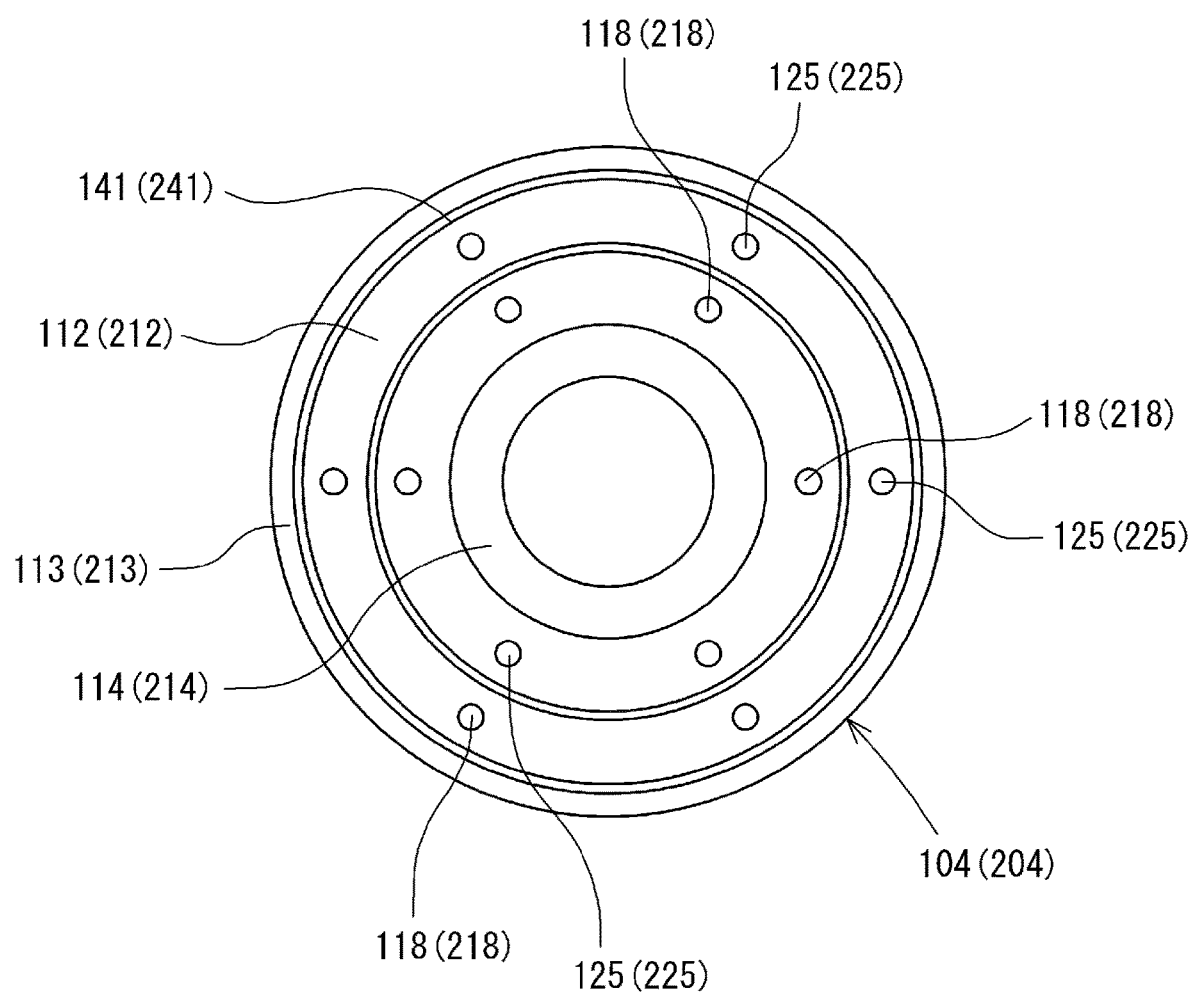
FIG. 8 is a view for illustrating a shape of a first seat portion of a pilot case to be used in the second embodiment and a fourth embodiment.

(Second Embodiment) Next, differences of a second embodiment from the first embodiment are described with reference to FIG. 7 and FIG. 8. The same names and reference symbols are used for parts common to the first embodiment, and an overlapping description thereof is omitted.

In the first embodiment, a plurality of first pressure-receiving chambers 112, 212 are separated by the seat portion 115, 215 (first seat portion) having an irregular shape on the end surface (lower surface 113, upper surface 213) of the bottom portion of the pilot case 104, 204. Meanwhile, in the second embodiment, a pilot case 104, 204 has a seat portion 141, 241 (first seat portion) having an annular shape and a seat portion 142, 242 (third seat portion) having an annular shape, which are formed on an end surface (lower surface 113, upper surface 213) of its bottom portion. An outer peripheral edge portion of a disc valve 106, 206 is seated on the seat portion 141, 241. The seat portion 142, 242 is formed on an inner periphery side with respect to the seat portion 141, 241, and the disc valve 106, 206 is seated on the seat portion 142, 242. A first pressure-receiving chamber 112, 212 is defined by the seat portion 141, 241, the seat portion 142, 242, and the disc valve 106, 206.

The outer peripheral edge portion of the disc valve 106 is seated on the seat portion 141 (first seat portion) having an annular shape, which is formed on the lower surface 113 of the pilot case 104. In other words, the seat portion 141 having an annular shape is formed on an outer portion of the bottom portion of the pilot case 104. Further, the seat portion 142 having an annular shape is formed on the lower surface 113 of the pilot case 104 so as to be located on the inner periphery side of the seat portion 141. The first pressure-receiving chamber 112 having an annular shape, which is defined by the disc valve 106, is formed between the seat portion 141 and the seat portion 142 of the pilot case 104.

An annular recessed portion 143 is formed between the seat portion 142 and an inner peripheral portion 114 of the pilot case 104. An annular chamber 144 defined by the annular recessed portion 143 and the disc valve 106 is formed at a lower end of the bottom portion of the pilot case 104. In other words, the first pressure-receiving chamber 112 and the annular chamber 144 are separated from each other by the seat portion 142. The first pressure-receiving chamber 112 communicates with an annular recessed portion 109 on the opposite side, specifically, an extension-side back-pressure chamber 105 through a plurality of (six in the second embodiment) passages 145 passing through the bottom portion of the pilot case 104 in an upward and downward direction. Meanwhile, the annular chamber 144 communicates with a second pressure-receiving chamber 124 on the opposite side through a plurality of (six in the second embodiment) passages 146 passing through the bottom portion of the pilot case 104 in the upward and downward direction.

A disc 147, which is located at an uppermost position among a plurality of discs that form the disc valve 106, has opening portions 148 that communicate with the annular chamber 144. The seat portions 141 and 142 are in direct abutment against the disc 147. Further, a disc 149, which is adjacent to the disc 147 and is the second highest disc from the upper side, has a plurality of cutouts 150 extending from an outer periphery-side end portion in a radial direction. In this manner, during a compression stroke (during a reverse stroke), an extension-side back-pressure holding passage (downstream-side back-pressure introducing passage) for introducing a pressure of a working fluid in a cylinder lower chamber 2B (chamber on the upstream side) into an extension-side back-pressure chamber 105 via the cutouts 150 of the disc 149, the opening portions 148 of the disc 147, the annular chamber 144, the passages 146, the second pressure-receiving chamber 124, and a check valve 122 is defined. The extension-side back-pressure holding passage is isolated from the first pressure-receiving chamber 112.

Meanwhile, the outer peripheral edge portion of the disc valve 206 is seated on the seat portion 241 (first seat portion) having an annular shape, which is formed on the upper surface 213 of the pilot case 204. In other words, the seat portion 241 having an annular shape is formed on an outer portion of the bottom portion of the pilot case 204. Further, the seat portion 242 having an annular shape is formed on the upper surface 213 of the pilot case 204 so as to be located on the inner periphery side of the seat portion 241. The first pressure-receiving chamber 212 having an annular shape, which is defined by the disc valve 206, is formed between the seat portion 241 and the seat portion 242 of the pilot case 204.

An annular recessed portion 243 is formed between the seat portion 242 and an inner peripheral portion 214 of the pilot case 204. An annular chamber 244 defined by the annular recessed portion 243 and the disc valve 206 is formed at a lower end of the bottom portion of the pilot case 204. In other words, the first pressure-receiving chamber 212 and the annular chamber 244 are separated from each other by the seat portion 242. The first pressure-receiving chamber 212 communicates with an annular recessed portion 209 on the opposite side, specifically, a compression-side back-pressure chamber 205 through a plurality of (six in the second embodiment) passages 245 passing through the bottom portion of the pilot case 204 in an upward and downward direction. Meanwhile, the annular chamber 244 communicates with a second pressure-receiving chamber 224 on the opposite side through a plurality of (six in the second embodiment) passages 246 passing through the bottom portion of the pilot case 204 in the upward and downward direction.

A disc 247, which is located at a lowermost position among a plurality of discs that form the disc valve 206, has opening portions 248 communicates with the annular chamber 244. The seat portions 241 and 242 are in direct abutment against the disc 247. Further, a disc 249, which is adjacent to the disc 247 and the second lowest disc from the lower side, has a plurality of cutouts 250 extending from an outer periphery-side end portion in a radial direction. In this manner, during an extension stroke (during a reverse stroke), a compression-side back-pressure holding passage (downstream-side back-pressure introducing passage) for introducing a pressure of a working fluid in a cylinder upper chamber 2A (chamber on the upstream side) into a compression-side back-pressure chamber 205 via the cutouts 250 of the disc 249, the opening portions 248 of the disc 247, the annular chamber 244, the passages 246, the second pressure-receiving chamber 224, and a check valve 222 is defined. The compression-side back-pressure holding passage is isolated from the first pressure-receiving chamber 212.

According to the second embodiment, the same actions and effects as those obtained in the first embodiment described above can be obtained.

Figure 9:
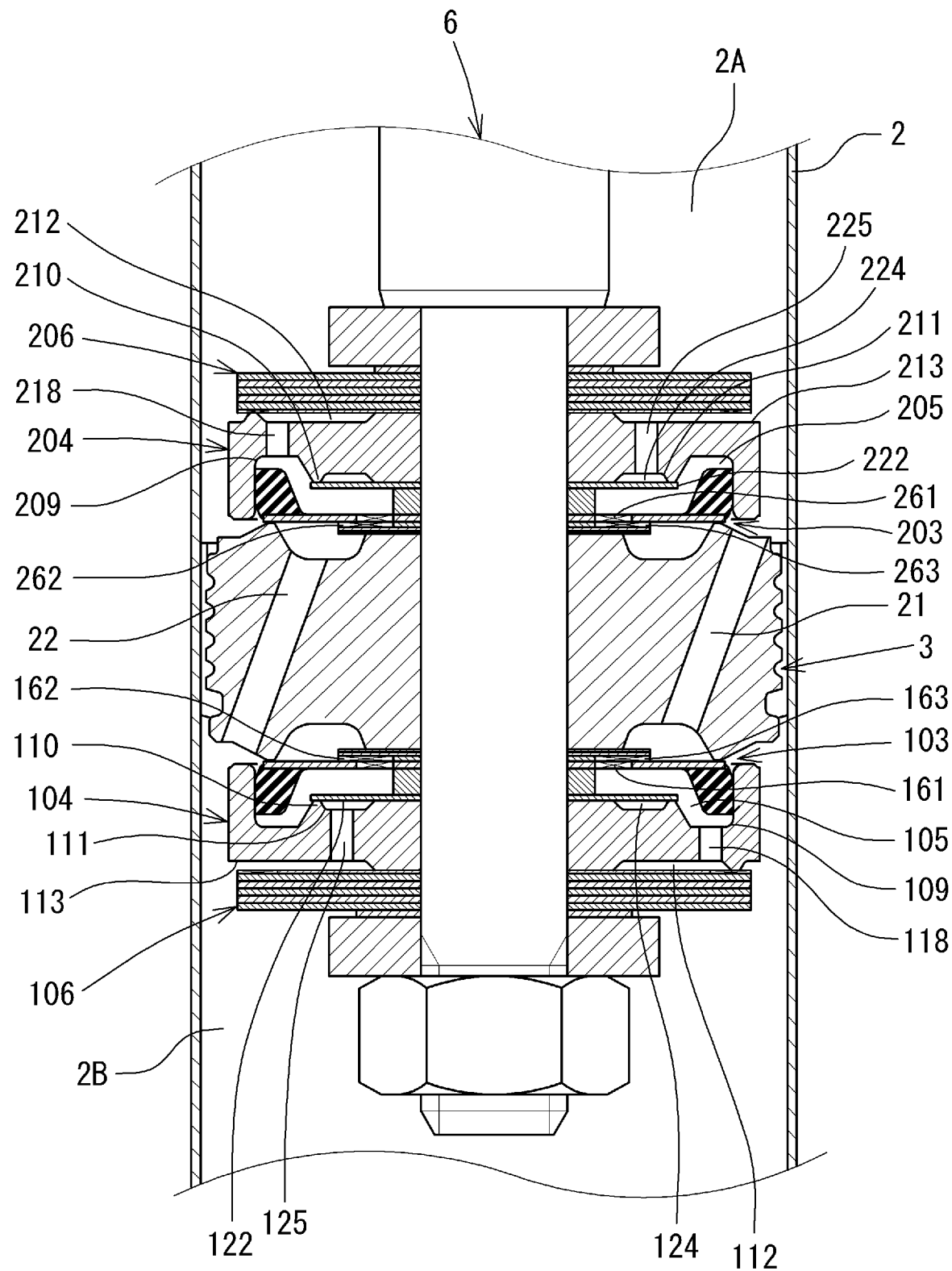
FIG. 9 is an explanatory view of the third embodiment.

(Third Embodiment) Next, differences of a third embodiment from the first embodiment are described with reference to FIG. 9. The same names and reference symbols are used for parts common to the first embodiment, and an overlapping description thereof is omitted.

In the first embodiment, the shock absorber includes a pilot control valve, and is configured to vary a damping-force characteristic by controlling flow of the working fluid in the common passage 13 of the piston bolt 7 through use of the solenoid 51. Meanwhile, a shock absorber according to the third embodiment does not include such a pilot control valve.

A plurality of (five in the third embodiment) first pressure-receiving chambers 112 are defined between a pilot case 104 and a disc valve 106. The first pressure-receiving chambers 112 are separated by a seat portion 115 (first seat portion) having an irregular shape, which is formed on a lower surface 113 of the pilot case 104. Five first pressure-receiving chambers 112, each being separated into a fan-like shape (see FIG. 4) by the seat portion 115, are equiangularly arranged between the pilot case 104 and the disc valve 106 in an extension-side damping valve 101. The pilot case 104 has passages 118 configured to bring the first pressure-receiving chambers 112 and an annular recessed portion 109 into communication with each other.

A plurality of discs are laminated between an extension-side main valve 103 and an inner peripheral portion of a piston 3. A disc 162, which is adjacent to the extension-side main valve among the plurality of discs, has a plurality of cutouts 163 extending from an outer periphery-side end portion in a radial direction. Opening portions 161 being in communication with the cutouts 163 of the disc 162 are formed in an inner peripheral portion of the extension-side main valve 103. During an extension stroke (forward stroke), an extension-side back-pressure introducing passage (upstream-side back-pressure introducing passage) for introducing a pressure of a working fluid in a cylinder upper chamber 2A (chamber on the upstream side) into an extension-side back-pressure chamber 105 via an extension-side passage 21, the cutouts 163 of the disc 162, and the opening portions 161 of the extension-side main valve 103 is defined.

Further, an outer peripheral edge portion of a check valve 122 having a disc-like shape is seated on a seat portion 110 (second seat portion) of the pilot case 104. The check valve 122 is a non-return valve, which permits only flow of the working fluid from a cylinder lower chamber 2B to the extension-side back-pressure chamber 105. A second pressure-receiving chamber 124 having an annular shape, which is defined by an annular recessed portion 111 and the check valve 122, is formed on an inner periphery side of the seat portion 110. The second pressure-receiving chamber 124 is isolated from the first pressure-receiving chambers 112, and communicates with the cylinder lower chamber 2B through a plurality of (five in the third embodiment) passages 125 formed in the pilot case 104.

During a compression stroke (during a reverse stroke), an extension-side back-pressure holding passage (downstream-side back-pressure introducing passage) for introducing a pressure of the working fluid in the cylinder lower chamber 2B (chamber on the upstream side) into the extension-side back-pressure chamber 105 via the passages 125, the second pressure-receiving chamber 124, and the check valve 122 is defined. The extension-side back-pressure holding passage is isolated from the first pressure-receiving chambers 112.

Meanwhile, a plurality of (five in the third embodiment) first pressure-receiving chambers 212 are defined between a pilot case 204 and a disc valve 206. The first pressure-receiving chambers 212 are separated by a seat portion 115 (first seat portion) having an irregular shape, which is formed on an upper surface 213 of the pilot case 204. Five first pressure-receiving chambers 212, each being separated into a fan-like shape (see FIG. 4) by the seat portion 215, are equiangularly arranged between the pilot case 204 and the disc valve 206 in a compression-side damping valve 201. The pilot case 204 has passages 218 configured to bring the first pressure-receiving chambers 212 and an annular recessed portion 209 into communication with each other.

A plurality of discs are laminated between an extension-side main valve 203 and an inner peripheral portion of a piston 3. A disc 262, which is adjacent to the extension-side main valve among the plurality of discs, has a plurality of cutouts 263 extending from an outer periphery-side end portion in a radial direction. Opening portions 261 being in communication with the cutouts 263 of the disc 262 are formed in an inner peripheral portion of the compression-side main valve 203. During a compression stroke (forward stroke), a compression-side back-pressure introducing passage (upstream-side back-pressure introducing passage) for introducing a pressure of a working fluid in a cylinder lower chamber 2B (chamber on the upstream side) into a compression-side back-pressure chamber 205 via a compression-side passage 22, the cutouts 263 of the disc 262, and the opening portions 261 of the compression-side main valve 203 is defined.

Further, an outer peripheral edge portion of a check valve 222 having a disc-like shape is seated on a seat portion 210 (second seat portion) of the pilot case 204. The check valve 222 is a non-return valve, which permits only flow of the working fluid from a cylinder upper chamber 2A to the compression-side back-pressure chamber 205. A second pressure-receiving chamber 224 having an annular shape, which is defined by an annular recessed portion 211 and the check valve 222, is formed on an inner periphery side of the seat portion 210. The second pressure-receiving chamber 224 is isolated from the first pressure-receiving chambers 212, and communicates with the cylinder upper chamber 2A through a plurality of (five in the third embodiment) passages 225 formed in the pilot case 204.

During an extension stroke (during a reverse stroke), a compression-side back-pressure holding passage (downstream-side back-pressure introducing passage) for introducing a pressure of the working fluid in the cylinder upper chamber 2A (chamber on the upstream side) into the compression-side back-pressure chamber 205 via the passages 225, the second pressure-receiving chamber 224, and the check valve 222 is defined. The compression-side back-pressure holding passage is isolated from the first pressure-receiving chambers 212.

According to the third embodiment, the same actions and effects as those obtained in the first and the second embodiments described above can be obtained.

Figure 10:
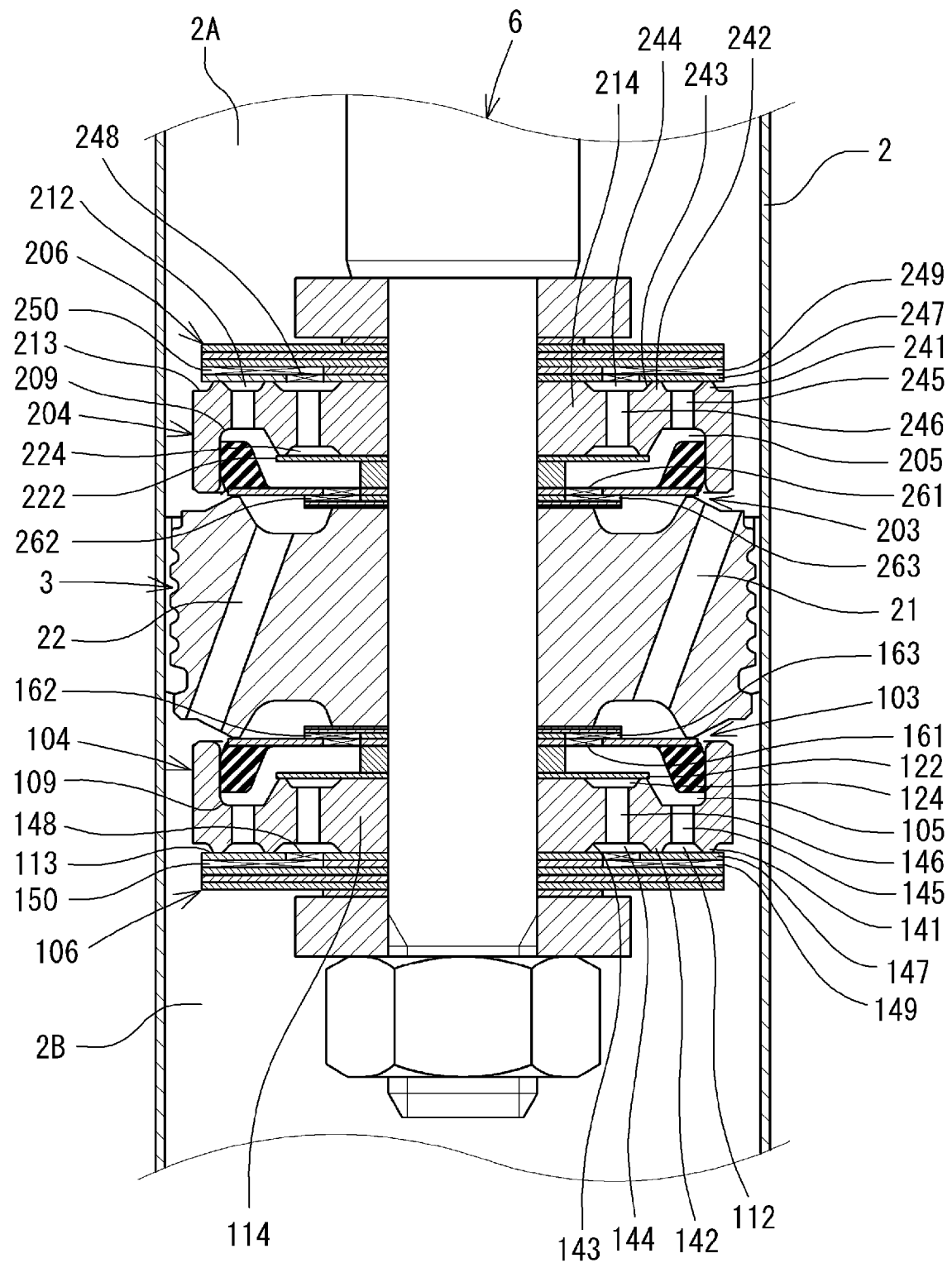
FIG. 10 is an explanatory view of the fourth embodiment.

(Fourth Embodiment) Next, differences of a fourth embodiment from the third embodiment are described with reference to FIG. 10. The same names and reference symbols are used for parts common to the first to third embodiments, and an overlapping description thereof is omitted.

The fourth embodiment is achieved by applying features of the second embodiment to the shock absorber according to the third embodiment, which does not include a pilot control valve. Specifically, in the fourth embodiment, a pilot case 104, 204 has a seat portion 141, 241 (first seat portion) having an annular shape and a seat portion 142, 242 having an annular shape, which are formed on an end surface (lower surface 113, upper surface 213) of its bottom portion. An outer peripheral edge portion of a disc valve 106, 206 is seated on the seat portion 141, 241. The seat portion 142, 242 is formed on an inner periphery side with respect to the seat portion 141, 241, and the disc valve 106, 206 is seated on the seat portion 142, 242. A first pressure-receiving chamber 112, 212 is defined by the seat portion 141, 241, the seat portion 142, 242, and the disc valve 106, 206.

With the configuration described above, during a compression stroke (during a reverse stroke), an extension-side back-pressure holding passage (downstream-side back-pressure introducing passage) for introducing a pressure of a working fluid in a cylinder lower chamber 2B (chamber on the upstream side) into an extension-side back-pressure chamber 105 via cutouts 150 of a disc 149, opening portions 148 of a disc 147, an annular chamber 144, passages 146, a second pressure-receiving chamber 124, and a check valve 122 is defined. The extension-side back-pressure holding passage is isolated from the first pressure-receiving chambers 112. Meanwhile, during an extension stroke (during a reverse stroke), a compression-side back-pressure holding passage (downstream-side back-pressure introducing passage) for introducing a pressure of a working fluid in a cylinder upper chamber 2A (chamber on the upstream side) into a compression-side back-pressure chamber 205 via passages 225, a second pressure-receiving chamber 224, and a check valve 222 is defined. The compression-side back-pressure holding passage is isolated from the first pressure-receiving chambers 212.

According to the fourth embodiment, the same actions and effects as those obtained in the first to third embodiments described above can be obtained.

Figure 11:
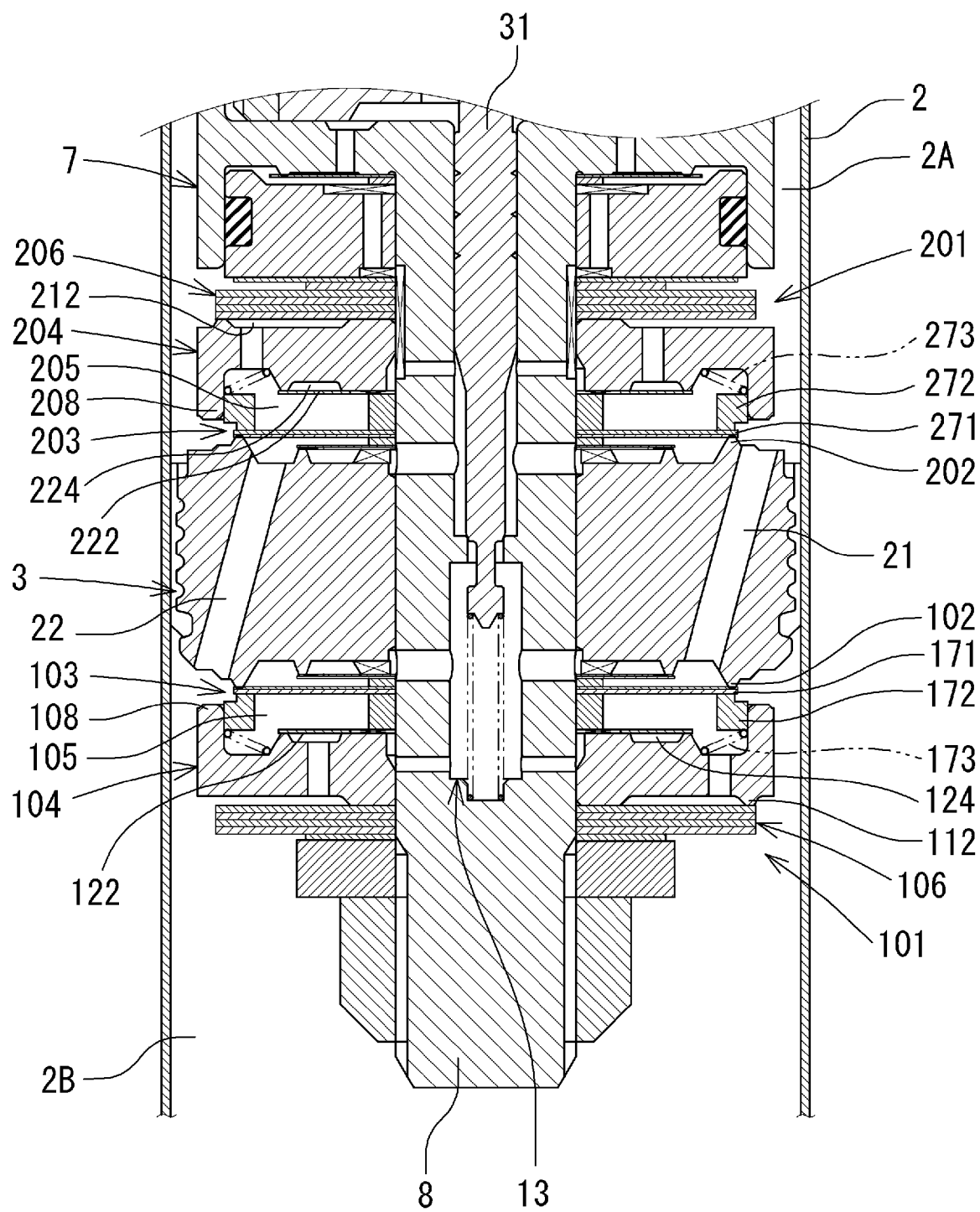
FIG. 11 is an explanatory view of the fifth embodiment.

(Fifth Embodiment) Next, differences of a fifth embodiment from the first embodiment are described with reference to FIG. 11. The same names and reference symbols are used for parts common to the first embodiment, and an overlapping description thereof is omitted.

In the first embodiment, each of the main valves 103 and 203 of the extension-side damping valve 101 and the compression-side damping valve 201 is a packing valve provided with the annular sealing portion 107, 207 (elastic sealing member), each being formed of an elastic body and provided in contact with the inner peripheral surface of the annular wall portion 108, 208 (cylindrical portion) of the pilot case 104, 204 over the entire periphery. The sealing portion 107, 207 is integrally and firmly fixed to the main valve 103, 203.

Meanwhile, in the fifth embodiment, a main valve 103, 203 includes a disc valve 171, 271, and a spool 172, 272 (elastic sealing member) having an annular shape, which are formed separately. The disc valve 171, 271 has an outer peripheral edge portion, which is seated on an annular seat portion 102, 202 of a piston 3. The spool 172, 272 is pressed by conical coil springs 173, 273 (urging member) against a surface on the back-pressure chamber 105, 205 side, specifically, an inner peripheral surface of an annular wall portion 108, 208 of the pilot case 104, 204 and a surface of an outer peripheral edge portion of a disc valve 171, 271, which is located on the side opposite to a seat portion 102, 202. The conical coil springs 173 and 273 are provided in an annular recessed portion 109, 209 (inner part of a bottom portion) of the pilot case 104, 204.

According to the fifth embodiment, the same actions and effects as those obtained in the first embodiment described above can be obtained.

The main valve 103, 203 according to the fifth embodiment, which includes the disc valve 171, 271, the spool 172, 272 (sealing portion), and the conical coil springs 173, 273 (urging member), is applicable to the second to fourth embodiments.

Note that, the present invention is not limited to the embodiments described above, and includes further various modification examples. For example, in the embodiments described above, the configurations are described in detail in order to clearly describe the present invention, but the present invention is not necessarily limited to an embodiment that includes all the configurations that have been described. Further, a part of the configuration of a given embodiment can replace the configuration of another embodiment, and the configuration of another embodiment can also be added to the configuration of a given embodiment. Further, another configuration can be added to, deleted from, or replace a part of the configuration of each of the embodiments.

The present application claims a priority based on Japanese Patent Application No. 2019-007104 filed on Jan. 18, 2019. All disclosed contents including Specification, Scope of Claims, Drawings, and Abstract of Japanese Patent Application No. 2019-007104 filed on Jan. 18, 2019 are incorporated herein by reference in their entirety.

REFERENCE SIGNS LIST

1 shock absorber, 2 cylinder, 2A cylinder upper chamber, 2B cylinder lower chamber, 3 piston, 6 piston rod, 21 extension-side passage (passage), 22 compression-side passage (passage), 103, 203 main valve, 105, 205 back-pressure chamber, 104, 204 case member, 106, 206 disc valve (sub-valve), 110, 210 seat portion (second seat portion), 115, 215 seat portion (first seat portion), 112, 212 first pressure-receiving chamber, 122, 222 check valve

The invention claimed is:

1. A shock absorber, comprising:
a cylinder in which a working fluid is enclosed;
a piston, which is slidably inserted into the cylinder, and is configured to partition an inside of the cylinder into two chambers;
a piston rod, which is coupled to the piston, and extends to an outside of the cylinder;
a passage in which flow of the working fluid is caused by movement of the piston in one direction;
a main valve configured to apply a resistance force to flow of the working fluid in the passage from a first chamber of the two chambers, which is the upstream side in the compression stroke of the piston and the downstream side in the extension stroke of the piston, to a second chamber of the two chambers, which is the upstream side in the extension stroke of the piston and the downstream side in the compression stroke of the piston;
a back-pressure chamber configured to exert an internal pressure on the main valve in a valve-closing direction of the main valve;
a case member having a bottomed cylindrical shape with an opening portion at one end, over which the main valve is arranged, the case member including the back-pressure chamber defined inside;
an upstream-side back-pressure introducing passage configured to introduce the working fluid from the first chamber into the back-pressure chamber; and
a sub-valve to be seated on a first seat portion formed on an outer portion of the bottom portion of the case member, which is configured to define a first pressure-receiving chamber on an inner side of the first seat portion, the first pressure-receiving chamber communicating with the back-pressure chamber, and to be opened by a pressure in the back-pressure chamber to apply a resistance force to the flow of the working fluid to the second chamber,
wherein the first seat portion includes an outer peripheral seat portion extending along an outer peripheral portion of the case member, an inner seat portion arranged on an inner side of the outer peripheral seat portion, and connecting seat portions extending in a radial direction to connect the inner seat portion and ends of the outer peripheral seat portion to each other,
the shock absorber further comprising:
a downstream-side back-pressure introducing passage defined in the bottom portion of the case member, which is configured to introduce the working fluid from the second chamber with respect to flow of the working fluid, which is caused by movement of the piston in another direction, and is isolated from the first pressure-receiving chamber by the first seat portion;
a second seat portion formed on an inner side of the bottom portion of the case member, which is configured to define a second pressure-receiving chamber on an inner side, the second pressure-receiving chamber communicating with the downstream-side back-pressure introducing passage; and
a check valve to be seated on the second seat portion, which is allowed to be opened by the working fluid from the downstream-side back-pressure introducing passage,
wherein the check valve has a slit extending from an inner periphery-side end portion in a radial direction, and
wherein the slit connects the first chamber and the second chamber.

2. The shock absorber according to claim 1, further comprising first passages configured to bring the back-pressure chamber and the first pressure-receiving chamber into communication with each other,
wherein the upstream-side back-pressure introducing passage and the downstream-side back-pressure introducing passage are located closer to the piston rod than the first passages.

3. The shock absorber according to claim 2, wherein the bottom portion of the case member has the back-pressure introducing passage and the first passages.

4. The shock absorber according to claim 1, further comprising an elastic sealing member, which is provided at an outer peripheral portion of a surface of the main valve on the back-pressure chamber side, and is configured to seal the back-pressure chamber.

5. The shock absorber according to claim 4, wherein the elastic sealing member is integrally and firmly fixed to the main valve.

6. The shock absorber according to claim 1, wherein the first seat portion comprises a plurality of arc-shaped portions.

7. A shock absorber, comprising:
a cylinder in which a working fluid is enclosed;
a piston, which is slidably inserted into the cylinder, and is configured to partition an inside of the cylinder into two chambers;
a piston rod, which is coupled to the piston, and extends to an outside of the cylinder;
a passage in which flow of the working fluid is caused by movement of the piston in one direction;
a main valve configured to apply a resistance force to flow of the working fluid in the passage from a first chamber of the two chambers, which is the upstream side in the compression stroke of the piston and the downstream side in the extension stroke of the piston, to a second chamber of the two chambers, which is the upstream side in the extension stroke of the piston and the downstream side in the compression stroke of the piston;
a back-pressure chamber configured to exert an internal pressure on the main valve in a valve-closing direction of the main valve, wherein the back-pressure chamber includes an extension-side back-pressure chamber and a compression-side back-pressure chamber;
a case member having a bottomed cylindrical shape with an opening portion at one end, over which the main valve is arranged, the case member including the back-pressure chamber defined inside;
an upstream-side back-pressure introducing passage configured to introduce the working fluid from the first chamber into the back-pressure chamber;
a sub-valve to be seated on an annular first seat portion formed on an outer portion of the bottom portion of the case member, which is configured to define a first pressure-receiving chamber on an inner side of the first seat portion, the first pressure-receiving chamber communicating with the back-pressure chamber, and can be opened by a pressure in the back-pressure chamber to apply a resistance force to the flow of the working fluid to the second chamber,
wherein the first seat portion includes an outer peripheral seat portion extending along an outer peripheral portion of the case member, an inner seat portion arranged on an inner side of the outer peripheral seat portion, and connecting seat portions extending in a radial direction to connect the inner seat portion to ends of the outer peripheral seat portion;

a common passage configured to bring the extension-side back-pressure chamber and the compression-side back-pressure chamber into communication with each other; and a pilot control valve provided in the common passage, the shock absorber further comprising:

a downstream-side back-pressure introducing passage defined in the bottom portion of the case member, which is configured to introduce the working fluid from the chamber of the first and second chambers on the upstream side with respect to flow of the working fluid, which is caused by movement of the piston in another direction, and is isolated from the first pressure-receiving chamber;

a second seat portion formed on an inner side of the bottom portion of the case member, which is configured to define a second pressure-receiving chamber on an inner side, the second pressure-receiving chamber communicating with the downstream-side back-pressure introducing passage; and a check valve to be seated on the second seat portion, which is allowed to be opened by the working fluid from the downstream-side back-pressure introducing passage, wherein the check valve has a slit extending from an inner periphery-side end portion in a radial direction, and wherein the slit connects the first chamber and the second chamber.

8. The shock absorber according to claim 7, further comprising:

a back-pressure adjustment mechanism configured to adjust back pressures in the extension-side back-pressure chamber and the compression-side back-pressure chamber through a common control valve, wherein the check valve has communication cutouts configured to bring the back-pressure chamber and the common passage into communication with each other.

9. The shock absorber according to claim 7, wherein the first seat portion comprises a plurality of arc-shaped portions.

* * * * *